United States Patent
Kasichainula et al.

(10) Patent No.: US 12,292,844 B2
(45) Date of Patent: May 6, 2025

(54) METHODS AND APPARATUS TO TRANSMIT AND/OR RECEIVE DATA STREAMS WITH A NETWORK INTERFACE CONTROLLER

(71) Applicant: Intel Corporation, Santa Clara, CA (US)

(72) Inventors: Kishore Kasichainula, Phoenix, AZ (US); Boon Leong Ong, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 737 days.

(21) Appl. No.: 17/132,992

(22) Filed: Dec. 23, 2020

(65) Prior Publication Data

US 2021/0117353 A1    Apr. 22, 2021

(51) Int. Cl.
*G06F 13/28* (2006.01)
*G06F 13/24* (2006.01)

(52) U.S. Cl.
CPC .............. *G06F 13/28* (2013.01); *G06F 13/24* (2013.01)

(58) Field of Classification Search
None
See application file for complete search history.

(56) References Cited

U.S. PATENT DOCUMENTS

| | | | |
|---|---|---|---|
| 8,392,631 B1* | 3/2013 | Mora | H04L 67/141 |
| | | | 710/33 |
| 10,185,678 B1* | 1/2019 | Stoler | G06F 13/4282 |
| 10,582,165 B2* | 3/2020 | Suzuki | H04N 23/63 |
| 10,754,816 B2 | 8/2020 | Kasichainula | |
| 2004/0034718 A1* | 2/2004 | Goldenberg | H04L 49/9031 |
| | | | 709/250 |
| 2017/0091128 A1* | 3/2017 | Mishaeli | G06F 13/24 |
| 2018/0276175 A1* | 9/2018 | Chandhoke | G06F 9/4881 |
| 2021/0014177 A1 | 1/2021 | Kasichainula | |

* cited by examiner

*Primary Examiner* — Henry Tsai
*Assistant Examiner* — Dean Phan
(74) *Attorney, Agent, or Firm* — HANLEY, FLIGHT & ZIMMERMAN, LLC

(57) ABSTRACT

Methods, apparatus, systems, and articles of manufacture to transmit and/or receive data streams with a network interface controller are disclosed. An example apparatus includes a direct memory access engine to fetch a descriptor for a data transmission from system memory; and determine a time to generate an interrupt based on the descriptor; a scheduler to trigger the interrupt when the time occurs, the interrupt to cause an application to sample data and store the sampled data as a payload data structure into the system memory; the direct memory access engine to access the payload data structure from the system memory; and the scheduler to cause transmission of the payload data structure.

25 Claims, 13 Drawing Sheets

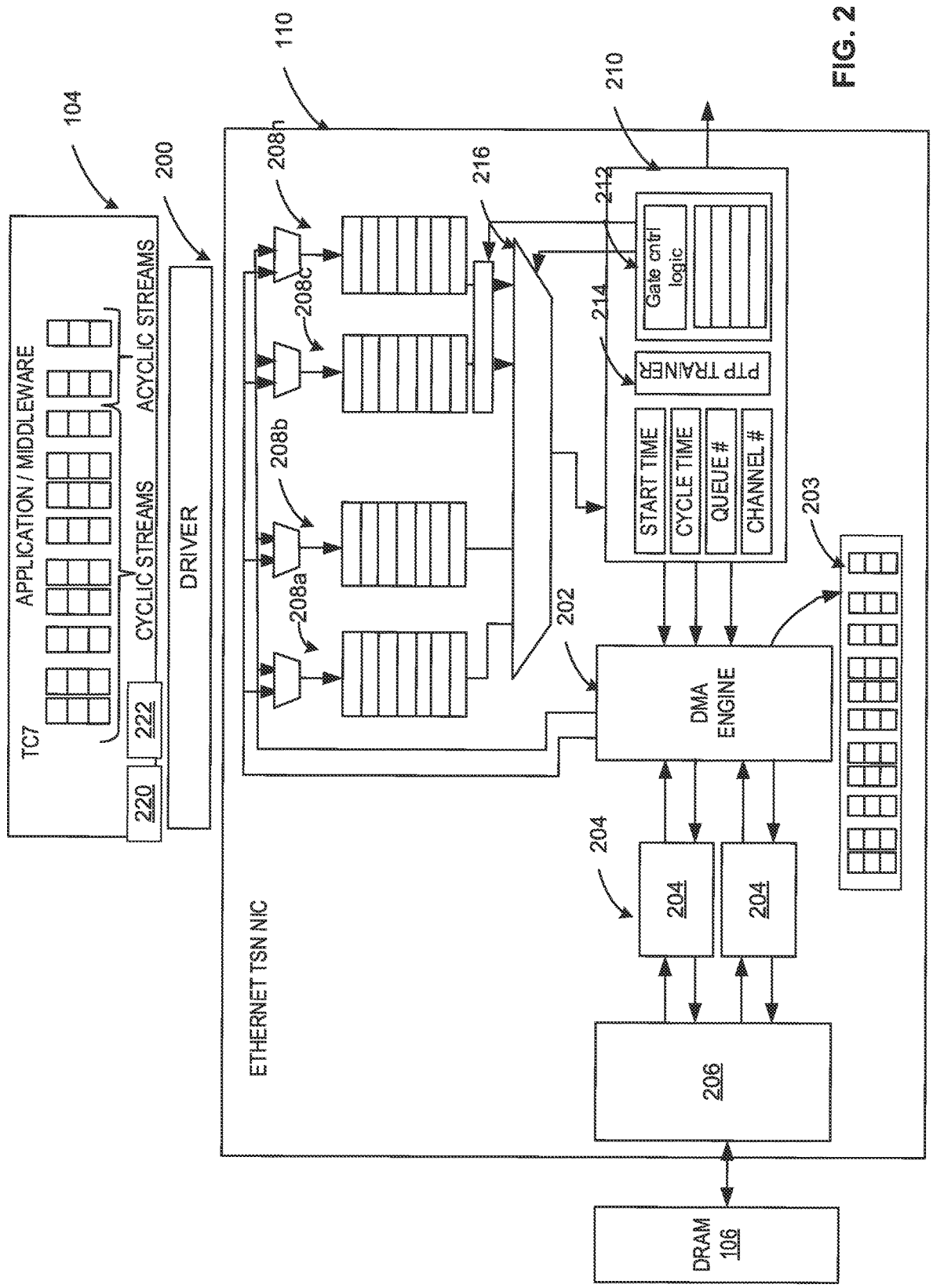

| BIT [57:38] | BIT [37:18] | BIT [17:9] | BIT [8:3] | BIT [2:0] |
|---|---|---|---|---|
| 20-BIT PHASE TIME OF STREAM. PHASE TIME IS PTP CLOCK ALIGNED WITHIN 1MS FRAME | 20-BIT STREAM DURATION TIME IN NS. DURATION CAN BE UP TO 1MS | 9-BIT REDUCTION RATIO OF EACH DMA CHANNEL. CAN SUPPORT REDUCTION RATION UP TO 512 | 6-BIT CHANNEL NUMBER. CAN SUPPORT UP TO 64 STREAMS; ONE STREAM PER DMA CHANNEL | 3-BIT QUEUE NUMBER ENTRY 1-QUEUE 7 |
| | | | | |
| | | | | |
| | | | | |

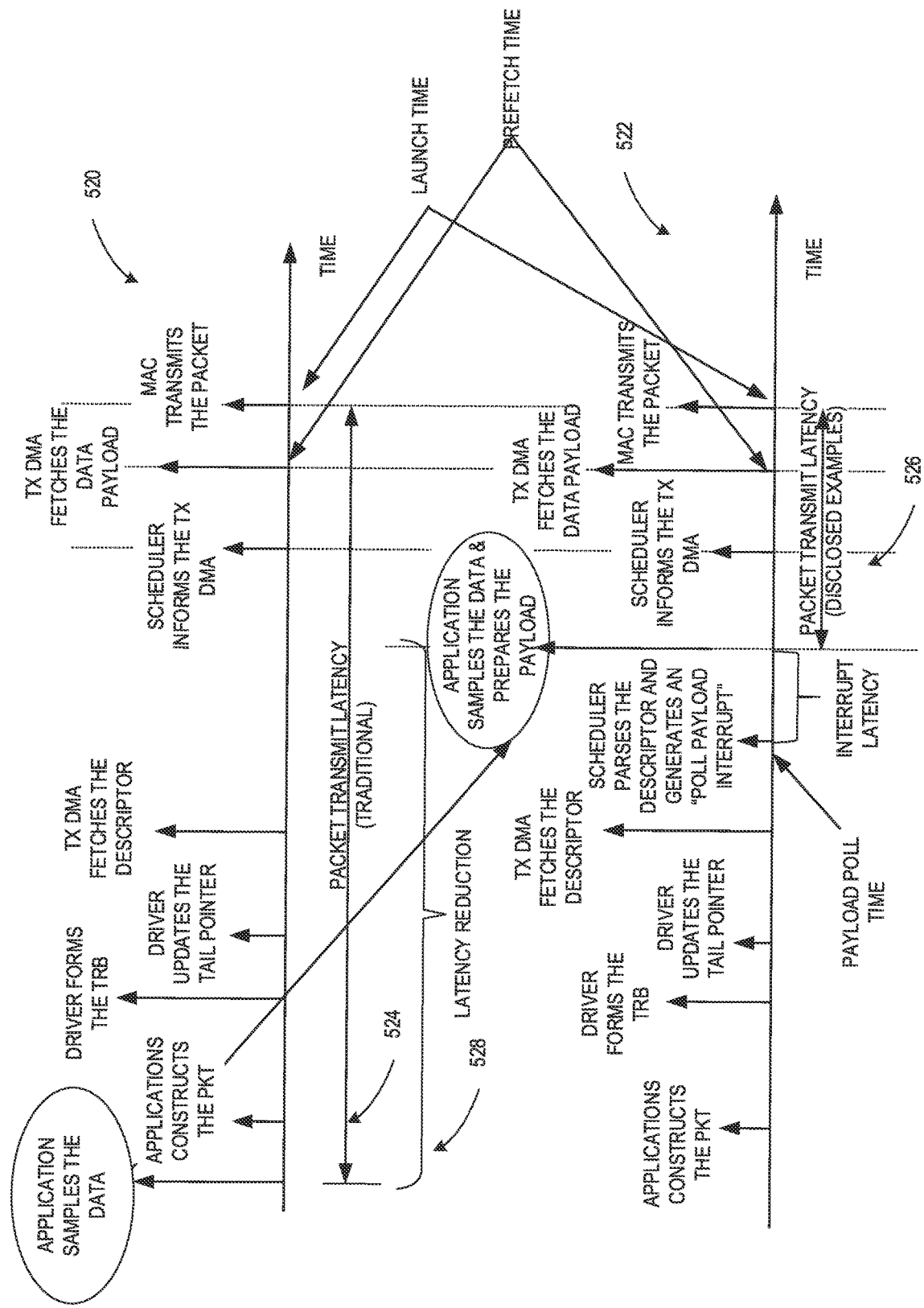
FIG. 5.B

METHODS AND APPARATUS TO TRANSMIT AND/OR RECEIVE DATA STREAMS WITH A NETWORK INTERFACE CONTROLLER

BACKGROUND

A processing unit (e.g., a central processing unit (CPU), a graphical processing unit (GPU) includes a network interface controller (NIC) to connect a computer to a computer network. The NIC is a hardware component that facilitates the transmission and/or reception of data based on instructions from an application operating on the processing unit. Some NICs include a direct memory access (DMA) engine that allows certain hardware subsystems to access main system memory independent of the CPU.

BRIEF DESCRIPTION OF THE DRAWINGS

FIG. 2 is a block diagram of an example implementation of the components of the processing system of FIG. 1.

FIG. 5B is an example timing diagram illustrated a decreased end-to-end latency associated with examples disclosed herein.

The figures are not to scale. In general, the same reference numbers will be used throughout the drawing(s) and accompanying written description to refer to the same or like parts.

Figure 1:
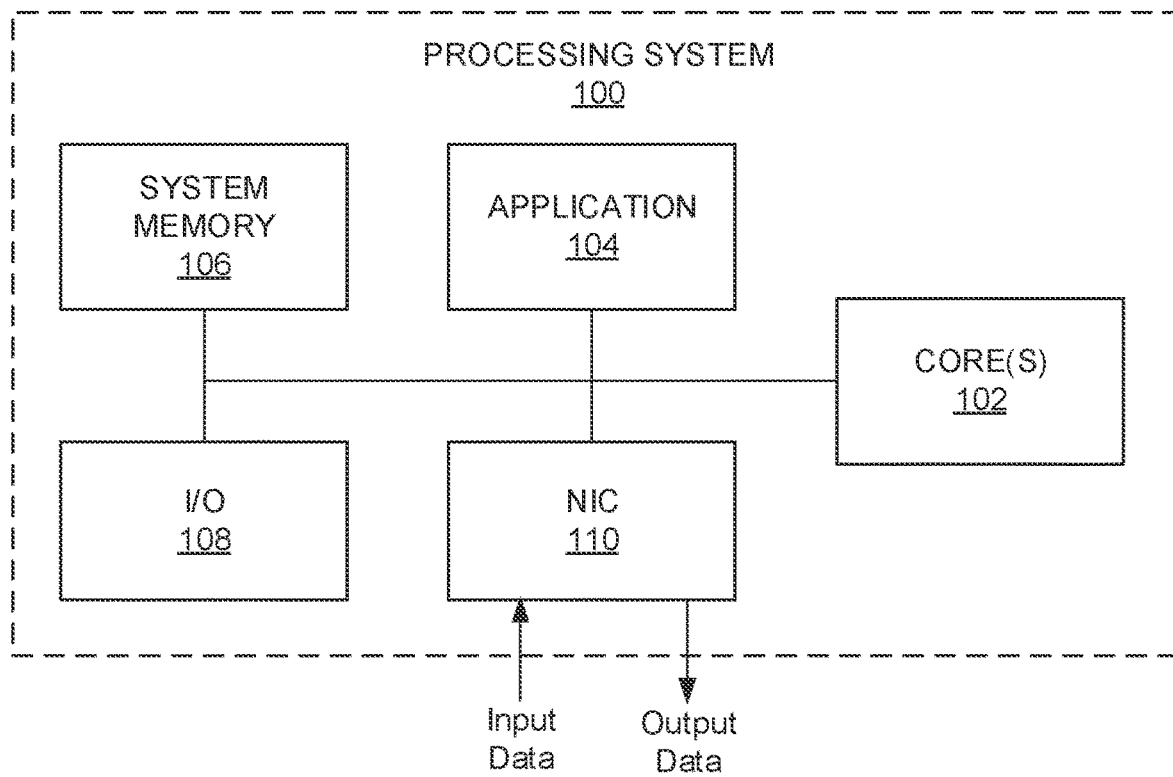
FIG. 1 is a block diagram of an example implementation of a processing system described in conjunction with examples disclosed herein.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A processing unit (e.g., a central processing unit (CPU), graphical processing unit (GPU), etc.) is electronic circuitry that executes instructions making up a program or workload. The processing unit may include one or more processor cores to execute the instructions by accessing data from main memory based on instructions from an application. The processing unit may further include a network interface controller (NIC) to receive and/or transmit data via a network. As computing devices have become more advanced, the demand for precise and fast data transfer across a network has led to the development of time sensitive networking. As used herein, time sensitive networking refers to a set of standards developed by the institute of electrical and electronics engineers (IEEE) 802.1 working group. Time sensitive networking protocols regarding data packet scheduling may be implemented in the industrial and/or automotive space to facilitate the transmission and/or reception of data to/from devices in a network.

In some devices, an application may attempt to send multiple types of data to a receiving device. In such examples, the NIC includes multiple queues to temporarily store the data for transmission and the time-sensitive networking (TSN) protocol and/or other standard may define when the data can be transmitted via the network. In some examples, the NIC may implement a traditional gate control list to control when the data stored in the multiple queues can be transmitted at particular points in time based on the protocol. In such traditional NICs, there is a transmission queue and a reception queue for each traffic class, where each traffic class corresponds to a data stream. The traffic class corresponds to the priority of the data (e.g., between 0 and 7). The traffic class is used according to quality of service disciplines to differentiate and/or control network traffic.

The traditional gate control list is an array which is programmed by an application and the NIC hardware executes the array one row at a time until it reaches the end and repeats the entire array again in a cyclic process. However, the traditional linear scheduling of data in such a traditional gate control list is not scalable for multiple data streams of the same traffic class. For example, as described above, the traditional NIC is structured to include 8 transmit queues that handle 8 data streams, where each stream is mapped to a different traffic class (e.g., each traffic class and data stream mapped to an individual queue). In such an example, data stream-0 is mapped to traffic class 0, data stream-1 is mapped to traffic class-1, etc. However, there may be multiple data periodic streams (e.g., repeated at different intervals represented by reduction ratios (RR)) that correspond to the same class. For example, within a given frame cycle, one data stream for a traffic class may need to be output just once in the frame cycle (e.g., RR=1) and another data stream for the traffic class may need to be output twice in the frame cycle (e.g., RR=2). Accordingly, if the frame cycle is 1 millisecond, the first data stream will repeat every 1 milliseconds and the second data stream will repeat every 500 microseconds.

As the number of multiple period steams per traffic class increase, the number of entries required in the gate control list to schedule the multiple periodic data streams by such traditional NICs becomes large, because an entry is needed for each data stream based on the reduction ratio. Thus, if the there is a first data stream with a reduction ratio of 128 for a traffic class (TC) 7, a second data steam with a reduction ratio of 256 on TC6, and a third data stream with a reduction ratio of 512 on TC5, the gate control list (GCL) array will need to be large enough to include 1789 entries to schedule the 1789 data streams (e.g., 255 entries for the first data stream, 511 entries for the second data stream, and 1023 entries for the third data stream). Because the size of the array affects the size of the NIC and the latency of the NIC, the larger the number of entries the larger the NIC and the higher the latency.

Further, a one to one mapping of data streams to traffic class in such traditional NICs results in a large number of queues. For example, if a traditional NIC needs to implement 27 periodic streams in hardware, a traditional NIC needs 27 queues to implement the 27 periodic streams, which results in a large amount of area and an increase in latency to implement. Examples disclosed herein map all data streams that correspond to a traffic channel to a single queue and schedule based on reduction ratios rather than the traditional linear based scheduling. In this manner, 27 data streams (e.g., with any corresponding reduction ratios) of a particular traffic can be implemented in a single queue and scheduled with 27 entries in the gate control list. Examples disclosed herein reduce the area needed to implement multiple cyclic data streams with less latency than traditional NICs because the application does not have to update the GCL for every frame cycle. Rather, the application initializes the GCL once and the hardware automatically executes the GCL for every frame, thereby freeing up CPU cycles for other tasks. Additionally, because the media access control (MAC) of the NIC is scheduling frames without the application updating the GCL, the frame to frame jitter is reduced.

Further, it may be desirable to keep the end-to-end latency and jitter to a minimum for particular devices (e.g., IoT real-time devices). To reduce latency and jitter, a NIC may transmit data packets from the user space to a physical wire in a short amount of time. In traditional NICs, data from the application must be available (e.g., stored in system memory) before a transmission descriptor ring buffer (TRB) is formed and control is passed to the NIC to obtain the data from the memory to transmit using a direct memory access (DMA). A descriptor describes the stored data (e.g., location of the data in the system memory, length of the data, etc.). A ring buffer (e.g., a circular buffer, a circular queue, a cyclic buffer, etc.) is a data structure where, when the last physical address of the memory space is reached, the hardware wraps the address around back to the beginning (e.g., corresponding to no beginning or end).

Using such traditional techniques, the application data is copied from the user space into the kernel space (e.g., where the shared memory is located) and only after the data is copied to the kernel space is the transmission descriptor ring formed with each descriptor in the transmission descriptor ring buffer pointing to an already available data payload (as referred to as a payload data structure). After the TRB is formed, the software driver advances the tail pointer within the NIC so that the NIC is able to start fetching and parsing the latest available descriptors. After the NIC obtains the address pointer to the payload, the NIC fetches the data payload and transmits the data payload as a packet at a scheduled launch time. However, because the application samples data to generate a payload before the NIC are able to prepare for the transmission, such traditional techniques include a large end-to-end latency and jitter because by the time the NIC obtains the payload for transmission, the payload is already out-of-date due to the time it takes for the NIC to prepare for transmission. The large end-to-end latency of such traditional techniques results in data payload being further from the real-time data. Accordingly, decreasing the end-to-end latency will cause the transmitted data to be accurately representative of real-time data.

Examples disclosed herein decouple and defer the data payload availability from traditional techniques by adding an interrupt at later stages and letting the application know when the NIC is ready to transmit the packet. In this manner, the software (e.g., the application) can form the TRB without the actual payload data to allow the NIC to prepare for the transmission and then copy the data payload from the user space just before the launch of the packet (e.g., when the NIC is ready to transmit), thereby reducing the end-to-end latency and allowing the application to provide the payload close to the transmission of the payload. Using examples disclosed herein, the transmission descriptor ring is formed without waiting for the data availability and the NIC is given early control by advancing the tail pointer. The NIC prefetches the descriptors and parses them without waiting for the data to be stored in the system memory, thereby allowing the NIC to prepare for transmission and let the application know when it is ready (e.g., using the interrupt) so that the application can sample data and prepare a more up-to-date payload than traditional techniques, thereby reducing end-to-end latency.

FIG. 1 is a block diagram of an example implementation of an example processing system 100. The example processing system 100 of FIG. 1 includes example core(s) 102, an example application 104, an example system memory 106, and an example MC 110.

The example processing system 100 of FIG. 1 is any type of processing unit (e.g., a CPU, a GPU, an accelerated processing unit (APU), general purpose GPU (GPGPU), etc.). For example, the processing system 100 may be an embedded system, a field programmable gate array, a shared-memory controller, a network on-chip, a networked system, and/or any other circuitry that includes a hardware (e.g., semiconductor based) processor, memory, and/or cache. The example processing system 100 utilizes processor resources (e.g., the logic circuitry of the example processor core(s) 102) to execute instructions to implement the example application 104. The example processor core(s) 102 of FIG. 1 execute(s) instructions (e.g., a workload) from the example application 104 (e.g., by reading and/or writing data). The processing system 100 may enable one or more of the core(s) 102 to execute the instructions.

The example application 104 of FIG. 1 may exhibit one or more computation phases to perform one or more tasks. The example application 104 uses the resources of the core(s) 102 to carry out instructions to perform the one or more tasks. In some examples, the application 104 facilitates the scheduling of the transmission of data packets by identifying whether data packets to be transmitted are cyclic (e.g., periodic) or acyclic (e.g., non-periodic). If the application 104 determines that a data packet is cyclic, the application provides the cyclic information to the NIC 110 to facilitate the scheduling of the cyclic data. The cyclic information may include phase time, duration of queue open, reduction ratio, traffic class information, and DMA channel information. If the application 104 determines that a data packet is acyclic, the application provides the acyclic information to the NIC 110 to facilitate the scheduling of the acyclic data. The acyclic information may include bandwidth information corresponding to an amount of bandwidth needed to transmit the acyclic information.

In some examples, the application 104 of FIG. 1 facilitates in reducing end-to-end latency and providing more up-to-data (e.g., latest, freshest, etc.) data samples representative of real-time data to the NIC 110. In such examples, the application 104 obtains a location of two frame buffers (e.g., a packet header and a payload data structure) prior to the submission of a real-time transmission packet (e.g., a sample or payload a payload data structure). The frame buffers correspond to the real-time transmission packet before it is sampled and stored into the system memory 106. The example application 104 generates and transmits an enhanced descriptor to allow the NIC 110 to prepare for transmission of the real-time transmission packet. The enhanced descriptor includes a launch time and packet length, a transmission descriptor type to support real-time payload polling, a poll time offset (e.g., from launch time) for packet payload buffer, addresses of the frame buffers for the header and payload, and a packet header length. In this manner, the NIC 110 can prepare for transmission before the data is sampled and generates an interrupt when it is ready for transmission. When the application 104 identifies the interrupt, the application 104 pushes current data as a payload to be stored in the system memory 106 to be transmitted by the NIC 110, thereby reducing end-to-end latency of traditional approaches. The example application 104 is further described below in conjunction with FIGS. 2 and 4.

The example system memory 106 of FIG. 1 stores data that is obtained from the example application 104 for transmission and/or stores received data. Additionally, the example NIC 110 pulls stored data from the example system memory 106 (e.g., via one or more components). In some examples, the system memory 106 stores the transmission descriptor rings and/or includes a transmission buffer, as further described below in conjunction with FIG. 4.

The example NIC 110 of FIG. 1 is hardware that schedules data transmission based on instructions from the application 104. In some examples, the NIC 110 pulls data from the system memory 106 for transmission and stores the data in various queues (e.g., corresponding to a traffic class). The Example NIC 110 uses enhanced gate control logic to generate/build a schedule for the data stored in the buffers based on a reduction ratio rather than traditional linear gate control logic. In this manner, the example NIC 110 can schedule multiple data streams corresponding to the same traffic class with less gate control list entries than traditional gate control lists. The example NIC 110 controls a MUX connected to each of the buffers to ensure that the data stored in the buffers is transmitted according to the enhanced gate control list based on the generated schedule, as further described below in conjunction with FIG. 2.

In some examples, the NIC 110 of FIG. 1 obtains enhanced descriptors from the application 104. The NIC 110 uses the enhanced descriptors to determine that it should fetch the payload after generating an interrupt when the NIC 110 is ready to transmit data (e.g., after the NIC 110 fetches and parses the descriptors and passes the details to a MAC of the NIC 110 to schedule the transmission of the data). The interrupt triggers the application 104 to poll (e.g., sample) the most current data and store in the system memory 106 at a first time (e.g., a time corresponding to a launch time minus the poll time offset). The NIC 110 obtains the polled data from the system memory 106 at a second time (e.g., a time corresponding to the launch time minus a prefetch time offset) to transmit as output data. The example NIC 110 is further described below in conjunction with FIGS. 2 and 4.

FIG. 2 is a block diagram of an example implementation of the NIC 110 and the application 104 of FIG. 1 to pull data from the example system memory 106 for transmission based on an enhanced gate control list. FIG. 2 includes the example application 104, the example system memory 106, the example NIC 110 and an example driver 200. The example NIC 110 includes an example direct memory access (DMA) engine 202, a first example interconnect(s) 204, a second example interconnect(s) 206, example queues 208a-208n, an example MAC 210, an example scheduler 212, an example timer 214, and an example multiplexer 216. The example application 104 includes an example data transmission manager 220, and an example traffic type detector 222. In the example of FIG. 2, the system memory 106 is implemented as dynamic random access memory (DRAM). However, the system memory 106 can be implemented by any other type of memory.

When the example application 104 of FIG. 2 wants to send data (e.g., cyclic or acyclic data streams that correspond to a traffic class) to another device, the example application 104 transmits data transmission information corresponding to how the data streams should be scheduled (e.g., phase time, duration of queue open, reduction ratio, traffic class information, DMA channel information, etc.) to the MAC 210. The MAC 210 parses the obtained data transmission information and transmits a request to the DMA engine 202 to access the corresponding data from the memory 106 to store in the example queues 208a-208n. The example application 104 includes the example data transmission manager 220 to determine when to transmit a data stream (e.g., based on a request and/or an instruction). The application 104 further includes the example traffic type detector 222 to detect whether the data to be transmitted is cyclic data (e.g., when the data stream is to be periodically transmitted) or acyclic data (e.g., when the data stream is not periodically transmitted). The example traffic type detector 222 outputs data corresponding to the cyclic and/or acyclic data to the MAC 210.

The example DMA engine 202 of FIG. 2 obtains requests to pull data from the example system memory 106 with a corresponding traffic class and channel number. The traffic class corresponds to a particular queue 208a-208n and the channel number corresponds to the priority of the data stream in the system memory 106. The example DMA engine 202 accesses the example descriptor cache 203 to obtain a pointer corresponding to the location of the requested data in the system memory 106. The descriptor cache 203 stores (e.g., prefetches) descriptors corresponding to the location (e.g., memory address) of data stored in the system memory 106. The descriptors are prefetched and stored locally at the descriptor cache 203 of the NIC 110. In this manner, the DMA engine 202 can find the memory address location of a data stream for a given channel. After the DMA engine 202 obtains the location for the data corresponding to the request, the DMA engine 202 passes the request with the corresponding location information to the example interconnect(s) 204 and/or the example interconnect 206. In some examples, the interconnect(s) 204 can be two interconnects (e.g., one for express traffic and one for best effort traffic). Additionally, after the request is sent to the example interconnect 204, the DMA engine 202 obtains the data stream from the system memory 106 via the interconnect 204. The DMA engine 202 stores the data in the example queue 208a-208n that corresponds to the traffic class of the data stream. In some examples, the DMA engine 202 may have dedicated paths for express traffic and/or best effort traffic.

The example queues 208a-208n of FIG. 2 are storage elements that store data streams. The example queues 208a-n correspond to different traffic classes. For example, the example queue 7 208a correspond to traffic class 7, the example queue 6 208b corresponds to traffic class 6, . . . , and the example queue 0 208n corresponds to traffic class 0. Although the example NIC 110 includes 8 queues, there may be any number of queues corresponding to any number of traffic classes. Additionally, although the example NIC 110 of FIG. 2, the example queues 2-7 correspond to cyclic data (e.g., data that repeats) and queues 0 and 1 correspond to acyclic data (e.g., data that is non-periodic), the number and/or order of queues that correspond to cyclic and/or acyclic data may be different.

The example MAC 210 of FIG. 2 obtains the requests to transmit data stream from the example application 104 via the example driver 200 and parses the request to identify a channel number and traffic class for the data stream. The MAC 210 transmits the request, the channel number, and the traffic class to the DMA 202 to instruct the DMA engine 202 to access the corresponding data from the example system memory 106 and store the accessed data in the queues 208a-208n that corresponds to the identified traffic class. Additionally, the MAC 210 stores the data corresponding to the request in an enhanced gate control list that defines the phase time, the stream duration time, the reduction ratio of each DMA channel, the channel number, and a queue/traffic class number for the data stream corresponding to the request. Before it is time to transmit the data, the example scheduler 212 of the MAC 210 develops (e.g., builds, generates, etc.) a schedule using the enhanced gate control list that schedules the order of the transmission of the data frames at various time slots of one or more frame cycles. For example, the scheduler 212 first schedules the cyclic data streams for each traffic class using example Equation 1.

$$\text{Schedule Time}(i,j) = \text{Phase Time}(i) + (j-1)\text{Frame period}/j, \text{ where } j=1 \text{ to RR and } i=\text{stream number} \quad \text{(Equation 1)}$$

In the above Equation 1, the schedule time is the time when the data stream is to be transmitted in a frame cycle, the phase time is the offset (e.g., which may be defined by the application 104 and/or may be based on priority information), the frame period is the period of the frame cycle, and RR is the reduction ratio. The order of the traffic classes and/or channels within a traffic class may be based on priority information, if available. After the cyclic data is built into a schedule within the time slots of frame cycles, the scheduler 212 builds the acyclic data in any remaining open time slots within the frame cycles based on the bandwidth information of the acyclic data (e.g., how long it will take to transmit the acyclic data). During the frame cycles, the example scheduler 212 outputs a control signal to the select input of the example MUX 216 to obtain and transmit (e.g., to another device) the data streams from the queues 208a-208n using the generated schedule and the clock 214 (e.g., the hardware based precision time protocol (PTP) timer).

Figures 3A, 3B:
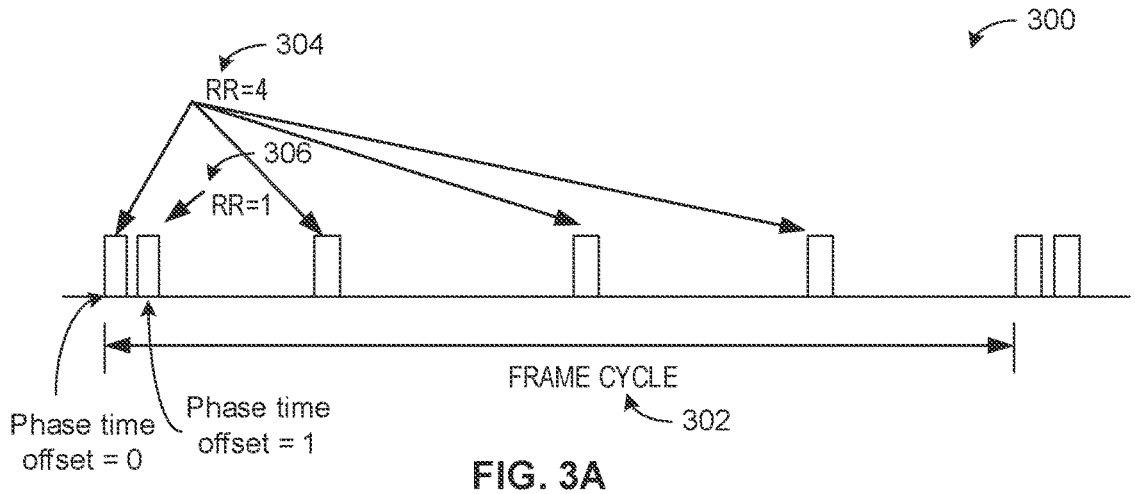
FIG. 3A is an example frame cycle including cyclic data streams.
FIG. 3B is an example enhanced gate control list.

FIG. 3A illustrates an example timing diagram 300 that illustrates how the reduction ratios translate to an example frame cycle 302. FIG. 3A includes two cyclic data streams 304, 306. In the illustrated example of FIG. 3, the RR of the first cyclic data stream 304 is 4 and the RR of the second cyclic data stream 306 is 1. Accordingly, the example NIC 110 schedules the first cyclic data stream 304 to be output 4 times (e.g., at 4 different time slots) within the frame cycle 302 and schedules the second cyclic data stream 304 to be output 1 time during the frame cycle 302. The offset (e.g., phase time) is different for the two cyclic data streams 304, 306 (e.g., data stream 204 has a phase time offset of 0 and data stream 306 has a data stream offset of 1) because the two data streams cannot be transmitted at the same time.

FIG. 3B illustrates an example enhanced gate control list 310 that the example scheduler 212 can use to build a schedule for the transmission data streams in one or more frame cycles. The example enhanced gate control list 310 includes an example queue number entry 312, an example channel number entry 314, an example reduction ratio entry 316, an example duration entry 318, and an example phase time entry 320. Although the example enhanced gate control list 310 includes five entries in a particular order corresponding to a particular number of bits and each entry is for a particular data stream, the enhanced gate control list 310 may include any number of entries of any size and in any order.

As described above, the example application 104 transmits a request to transmit data to the example MAC 210. The MAC 210 parses the request to populate the example entries 312-320 in the enhanced gate control list 310 for cyclic data streams. The example queue entry 312 is a 3-bit entry (e.g., bits 0-2) that identifies which queue to use to store the data stream and/or which traffic class the data stream will belong too. If there is a different number of queues, the number of bits for the queue entry 312 will be different.

The example channel number 314 of FIG. 3 is a 6-bit entry (e.g., bits 3-8, supporting up to 64 different streams) that identifies a channel of the data stream. The channel is mapped to a data stream and the channel corresponds to a priority.

The example reduction ratio entry 316 of FIG. 3 is a 9-bit entry (e.g., bits 9-17) that identifies the reduction ratio for the data stream. As described above, the reduction ratio corresponds to the number of times the same data stream should be output (e.g., repeated) during the frame cycle. Because the example reduction ratio entry 316 is a 9-bit entry, the reduction ratio entry 316 supports a reduction ratio of up to 512.

The example stream duration entry 318 of FIG. 3 is a 20-bit entry (e.g., bits 18-37) that identifies the duration of the stream (e.g., in nano seconds). Because there are 20-bits, the duration of the stream can be some duration of time up to 1 millisecond.

The example phase time entry 320 of FIG. 3 is a 20-bit entry (e.g., bits 38-57) that identifies the phase time (e.g., offset) of the stream. The phase time is aligned with the PTP clock 214 within a frame (e.g., slot). The example application 104 may utilize the phase time for precise scheduling of a data packet or data stream.

Figure 4:
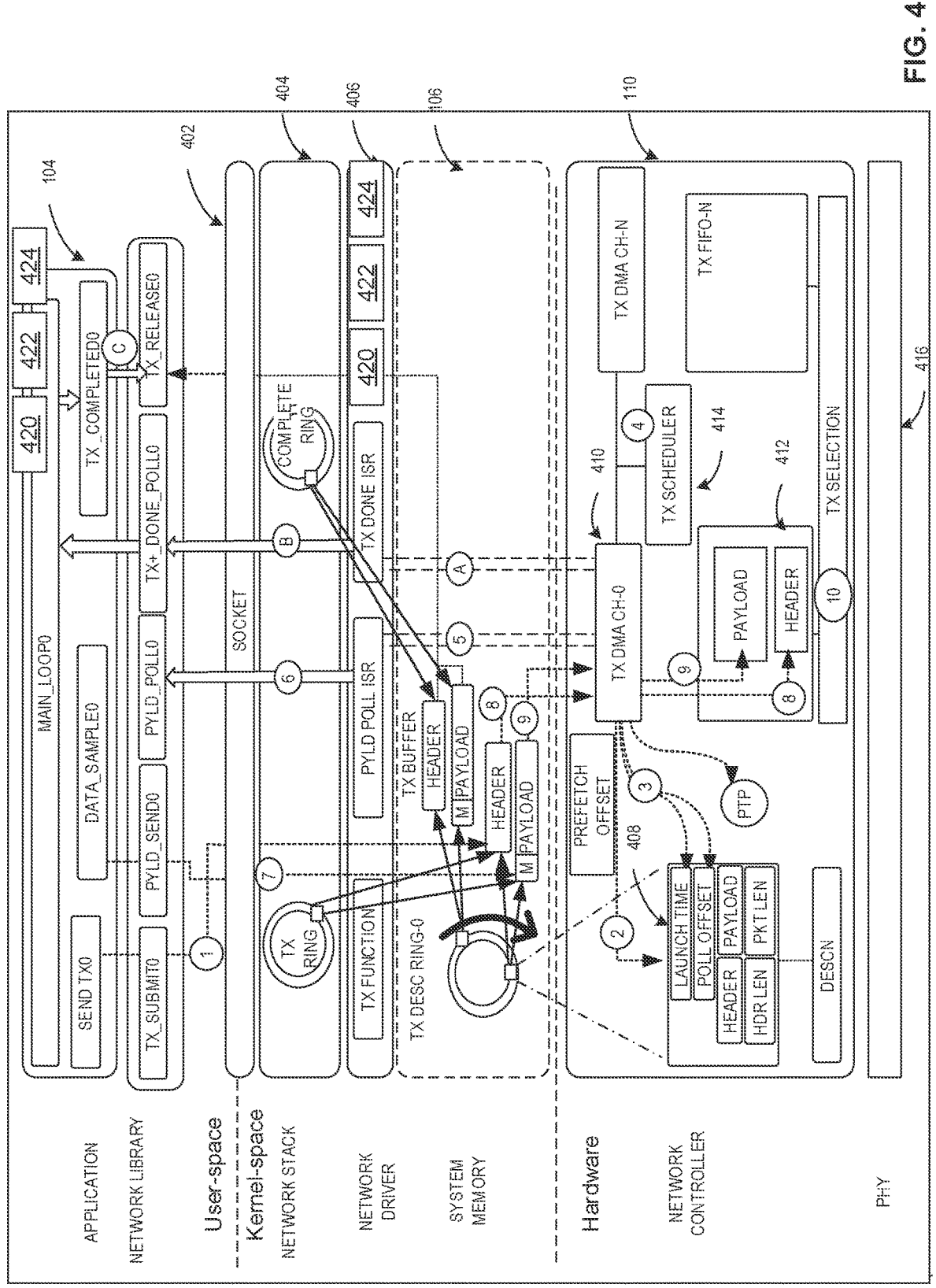
FIG. 4 is a block diagram of an alternative implementation of components of the processing system of FIG. 1.

FIG. 4 is a block diagram of an example implementation of the application 104, the system memory 106, and the NIC 110 of FIG. 1 to reduce end-to-end latency. FIG. 4 includes an example socket 402, an example network stack 404, an example network driver 406, an example DMA engine 410, an example queue 412, an example scheduler 414 (e.g., a MAC scheduler), and an example physical later (PHY) 416. The example application 104 includes an example memory address detector 420, an example descriptor generator 422, and an example payload generator 424. In some examples, the network driver 406 includes the example memory address detector 420, the example descriptor generator 422, and the example payload generator 424. In some examples, the memory address detector 420, the example descriptor generator 422, and/or the example payload generator 424 may be implemented in part by the application 104 and in part by the network driver 406. In the example of FIG. 4, the application 104 is software implemented in the user-space, the system memory 106, the network stack 404 and the network driver 406 are implemented in the kernel space, and the NIC 110, and the PHY 416 are implemented in hardware. In some examples, the network stack 404 is implemented in the system memory 106. Although the example NIC 110 includes N DMAs corresponding to N Channels and N queues, there may be a single DMA or any number of DMAs in communication with any number of queues. The example DMA engine 410 may be the example DMA engine 202 of FIG. 2, the example queue 412 may be one of the example queues 208a-208n of FIG. 2, and the example scheduler 414, may be the example scheduler 212 of FIG. 2.

Initially, when the example application 104 of FIG. 4 (e.g., using the example data transmission manager 220 of FIG. 2) determines or is requested to transmit data (e.g., real-time polling data), the example memory address detector 420 of the application 104 and/or the network driver 406 obtains a location of two frame buffers that will be used for the data (e.g., one for a packet header and one for a payload data structure) based on an allocation by a network driver 406. After the location has been obtained, the example descriptor generator 422 of the application 104 and/or the network driver 406 generates an enhanced descriptor. The enhanced descriptor includes a launch time (e.g., a time when the payload will be transmitted), a packet length (e.g., a length of the payload), a transmission descriptor type (e.g., to support real-time payload polling), a polling time offset (also referred to as poll time offset, polling offset time, or poll offset time) for the packet payload buffer, addresses of the frame buffers for the header and payload, and a packet header length. The example descriptor generator 422 of the application 104 and/or the example network driver 406 transmits the enhanced descriptor to be stored in the example system memory 106 and/or the network stack 404 (Circle-1).

After the application 104 and/or network driver 406 forms the descriptor, the network driver 406 of FIG. 4 advances (e.g. updates) a tail pointer of the descriptor to the NIC 110 which includes the pointer of the data payload. After the tail pointer is advanced, the example DMA engine 410 of the NIC 110 fetches the newly available descriptors shared between the user-space and the kernel-space (Circle-2). If the polling offset or transmission descriptor type field is set to zero, the example scheduler 414 performs a traditional flow by initiating the fetching operation at the preset prefetch time before the launch time. If the polling offset time is set to a non-zero value, the example scheduler 414 enters into a protocol based on the data of the enhanced descriptor (e.g., before the example payload generator 424 of the application 104 stores the payload data structure in the system memory 106 and corresponding to circles 3-10).

If the polling offset time is a non-zero value, the example scheduler 414 of FIG. 4 determines that the data payload has not yet been stored in the example system memory 106 (Circle 3). Accordingly, the example scheduler 212 generates an interrupt (e.g., a payload poll interrupt) to prompt the example payload generator 424 of the application 104 to generate the payload (e.g., sample/poll data) and store the payload in the system memory 106. The polling offset time value corresponds to the amount of time needed for the example payload generator 424 to generate and store the payload in the system memory 106. Accordingly, the example scheduler 212 generates the interrupt at a time corresponding to the launch time (e.g., the time when the payload needs to be transmitted) minus the poll time offset (Circle 4), thereby ensuring the most current data from the example payload generator 424 is used for the payload. The example scheduler 212 determines when to transmit and/or trigger the interrupt by monitoring a PTP timer (e.g., the example timer 214 of FIG. 2).

After the interrupt is generated and the launch time minus the poll time offset occurs, the example DMA engine 410 of FIG. 4 transmits and/or triggers the interrupt to the example payload generator 424 of the application 104 via the network driver 406 (Circles 5 and 6). The network driver 406 communicates data between the kernel space to the user-space via the example socket 402. The socket 402 acts as an interface between the user-space and the kernel-space. After the application 104 identifies the interrupt, the example payload generator 424 generates the payload data structure and stores the payload data structure into the system memory 106 (Circle 7). At the time launch time minus prefetch time offset (e.g., a predefined offset value corresponding to the amount of time the NIC 110 needs to obtain the payload from the memory 106 and transmit the packet via the PHY 416), the scheduler 414 requests the DMA engine 410 to fetch the packet header and the packet payload frame buffers from the system memory 106. The DMA engine 410 obtains the payload and the header from the system memory 106 and stores them in a corresponding queue 412 (e.g., DMA Channel 0 to queue 0, DMA Channel 1 to queue 1, etc.) (Circles 8 and 9). Although the queue 412 is implemented as a first-in first-out buffer, the queue 412 may be implemented using another type of storage.

The example DMA engine 410 of FIG. 4 may determine the packet payload length based on the packet length minus the header length (both of which may be written into the enhanced DMA descriptor). At launch time, the NIC 110 (e.g., the transmission selector of the NIC 110) reads the entire payload from the queue 412 and constructs the Ethernet frame corresponding to the header and payload and transmits the Ethernet frame via the PHY 416.

In some examples, an error may occur when the example payload generator 424 attempts to poll and/or store the data in the system memory 106. Accordingly, the example payload generator 424, when passing the sampled data/payload to be stored in the example system memory 106, includes a validity indication with the sampled data/payload. In this manner, the payload may include metadata in the headroom of the packet payload frame buffer. The metadata stores the indication value and the NIC 110 processes the metadata when fetching the payload to determine whether the payload is valid or invalid (e.g., triggering the discarding of the payload).

In some examples, the example payload generator 424 estimates a payload length when generating the enhanced descriptors. However, because the example payload generator 424 performs the data sampling after the enhanced descriptors are generated, the example payload generator 424 may incorrectly estimate the length of the payload. Accordingly, the example payload generator 424 may include an override indication that identifies that the payload length indicated in the enhanced descriptors is correct or incorrect. If incorrect, the example payload generator 424 includes the updated payload length, which is included in the metadata. In this manner, the example NIC 110 can process the metadata prior to fetching the payload to determine if the payload length has been overridden and uses the overridden length if it the payload length has been overridden. In this manner, if the payload has been overridden, the DMA engine 410 of the NIC 110 pulls the payload corresponding to the overridden length. Otherwise, the DMA engine 410 pulls the payload corresponding to originally estimated length. Additionally, the NIC 110 uses the overridden payload length for the packet length of the data packet to be transmitted.

Figure 5A:
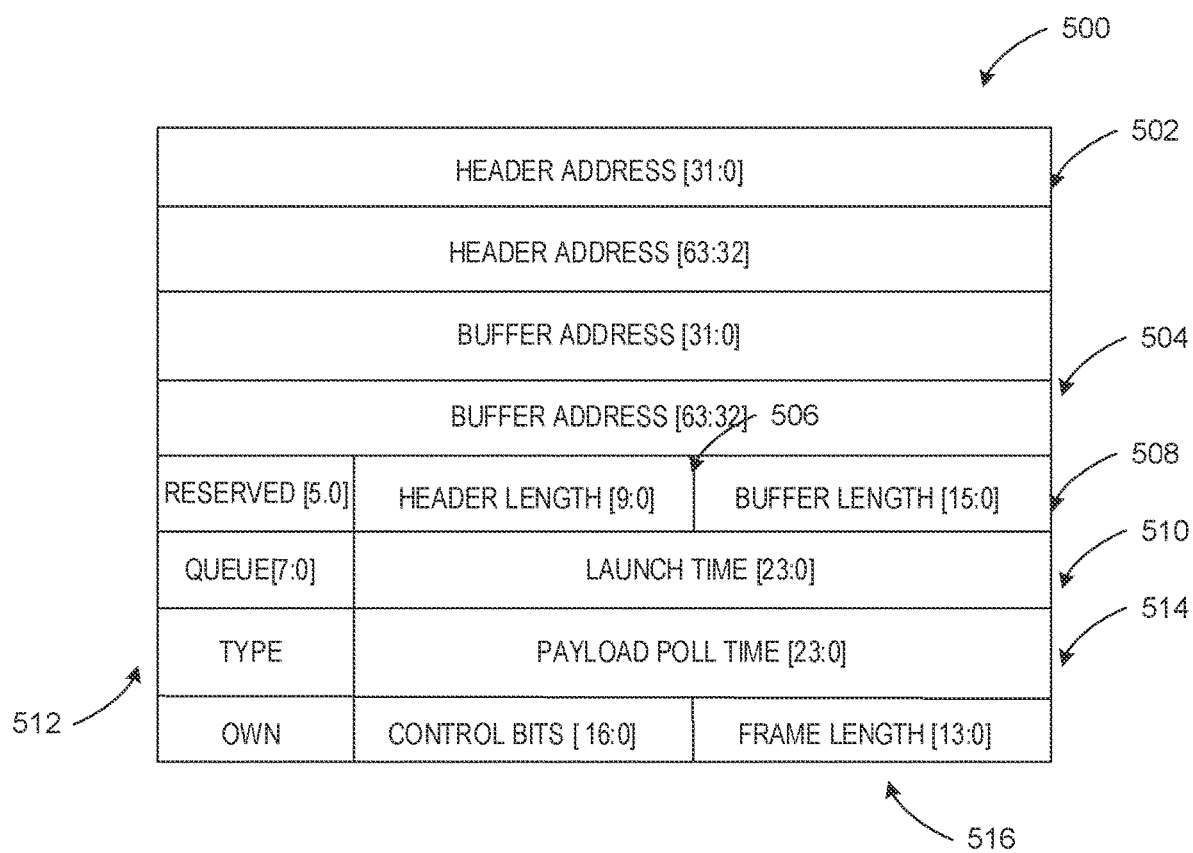
FIG. 5A is an example format for an enhanced descriptor.

FIG. 5A illustrates an example enhanced descriptor 500 that may be generated by the example application 104 and processed by the example NIC 110 of FIGS. 1 and/or 4. As illustrated in FIG. 5A, the example enhanced descriptor format 500 includes examples header address field(s) 502, example buffer address field(s) 504, an example header length field 506, an example buffer length field 508, an example launch time filed 510, an example type field 512, an example payload poll time field 514, and an example frame length field 516. Additionally, other fields may be included (e.g., reserved fields, queue/traffic class fields, OWN fields, control fields, etc.) Although the example enhanced descriptor 500 includes a particular number of fields in a particular order corresponding to a particular number of bits and each field, the enhanced descriptor 500 may include any number of entries of any size and in any order.

The example header address fields 502 of FIG. 5 includes data corresponding to the location (e.g., memory address) for the header in the system memory 106. The example buffer address fields 504 includes data corresponding to the location (e.g., memory address) for the payload (which is not occupied by the payload until after the interrupt is triggered) in the system memory 106. The example header length field 506 includes a value representative of a length of the header. The example buffer length field 508 includes a value representative of a length of the buffer. The example launch time field 510 includes a value indicative of the time to transmit the data packet. The example type field 512 includes a value indicative of the transmission descriptor type to support real-time payload polling. The example payload poll time field 514 includes a value indicative of the poll time offset, as described above. The example frame length 516 includes a value indicative of the length of the packet.

FIG. 5B illustrates timing diagrams 520, 522 that illustrates the decrease in latency between a first diagram 520 (e.g., corresponding to traditional techniques) and a second diagram 522 (e.g., corresponding to examples disclosed herein). The timing diagrams 520, 522 illustrate a first packet transmit latency 524 corresponding to traditional techniques, a second transmit latency 526 corresponding to examples disclosed herein, and a latency reduction 528.

In the first diagram 520 of FIG. 5B, the application 104 first samples the data and stores the sampled data into the system memory 106, and the driver 406 forms the TRB and updates and/or advances the tail pointer in the NIC 110 in response to the application storing the sampled data in the system memory 106. After the tail pointer is advanced, the NIC 110 fetches the descriptor and obtains the data as part of a payload and transmits the payload in a packet. The example packet transmit latency 524 corresponds to the amount of time between when the application samples the data and when the data is transmitted as a Tx packet.

In the second diagram 522 of FIG. 5B, the application 104 first constructs the descriptor without sampling and storing the sampled data in the system memory. As described above, the NIC 110 fetches the descriptors to prepare for transmission of the data packet without the payload. When the NIC 110 is ready, the NIC 110 generates the interrupt to trigger the application 104 to sample the data and prepare the payload in the system memory 106 based on the sampled data. Accordingly, the packet transmit latency 526 for the second diagram 522 is shorter than the latency 524 of the first diagram 520, thereby resulting in the latency reduction 528. The latency reduction 528 corresponds to a more accurate representation of real-time sampled data than techniques associated with the first diagram 520.

While an example manner of implementing the example processing system 100 is illustrated in FIGS. 1, 2, and/or 4 one or more of the elements, processes and/or devices illustrated in FIGS. 1, 2, and/or 4 may be combined, divided, re-arranged, omitted, eliminated and/or implemented in any other way. Further, the example core(s) 102, the example application 104, the example NIC 110, the example driver 200, the example DMA engine 202, the example interconnect 204, the example interconnect 206, the example MAC 210, the example scheduler 212, the example clock 214, the example data transmission manager 220, the example traffic type detector 222, the example interface 402, the example driver 406, and the example PHY 416, the example memory address detector 420, the example descriptor generator 422, the example payload generator 424, and/or, more generally, the example processing system 100 of FIGS. 1, 2, and/or 4 may be implemented by hardware, software, firmware and/or any combination of hardware, software and/or firmware. Thus, for example, any of the example core(s) 102, the example application 104, the example NIC 110, the example driver 200, the example DMA engine 202, the example interconnect 204, the example interconnect 206, the example MAC 210, the example scheduler 212, the example clock 214, the example data transmission manager 220, the example traffic type detector 222, the example interface 402, the example driver 406, and the example PHY 416, the example memory address detector 420, the example descriptor generator 422, the example payload generator 424, and/or, more generally, the example processing system 100 of FIGS. 1, 2, and/or 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example core(s) 102, the example application 104, the example NIC 110, the example driver 200, the example DMA engine 202, the example interconnect 204, the example interconnect 206, the example MAC 210, the example scheduler 212, the example clock 214, the example data transmission manager 220, the example traffic type detector 222, the example interface 402, the example driver 406, and the example PHY 416, the example memory address detector 420, the example descriptor generator 422, the example payload generator 424, and/or, more generally, the example processing system 100 of FIGS. 1, 2, and/or 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example processing system 100 may include one or more elements, processes and/or devices in addition to, or instead of, those illustrated in FIGS. 1, 2 and/or 4, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example processing system 100 of FIGS. 1, 2, and/or 4 are shown in FIGS. 6-9B. The machine readable instructions may be one or more executable programs or portion(s) of an executable program for execution by a computer processor such as the processor 1012 shown in the example processor platform 1000 discussed below in connection with FIG. 10. The program(s) may be embodied in software stored on a non-transitory computer readable storage medium such as a CD-ROM, a floppy disk, a hard drive, a DVD, a Blu-ray disk, or a memory associated with the processor 1012, but the entirety of the program(s) and/or parts thereof could alternatively be executed by a device other than the processor 1012 and/or embodied in firmware or dedicated hardware. Further, although the example program(s) is/are described with reference to the flowchart illustrated in FIG. 10, many other methods of implementing the example processing system 100 of FIGS. 1, 2 and/or 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-9B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 6:
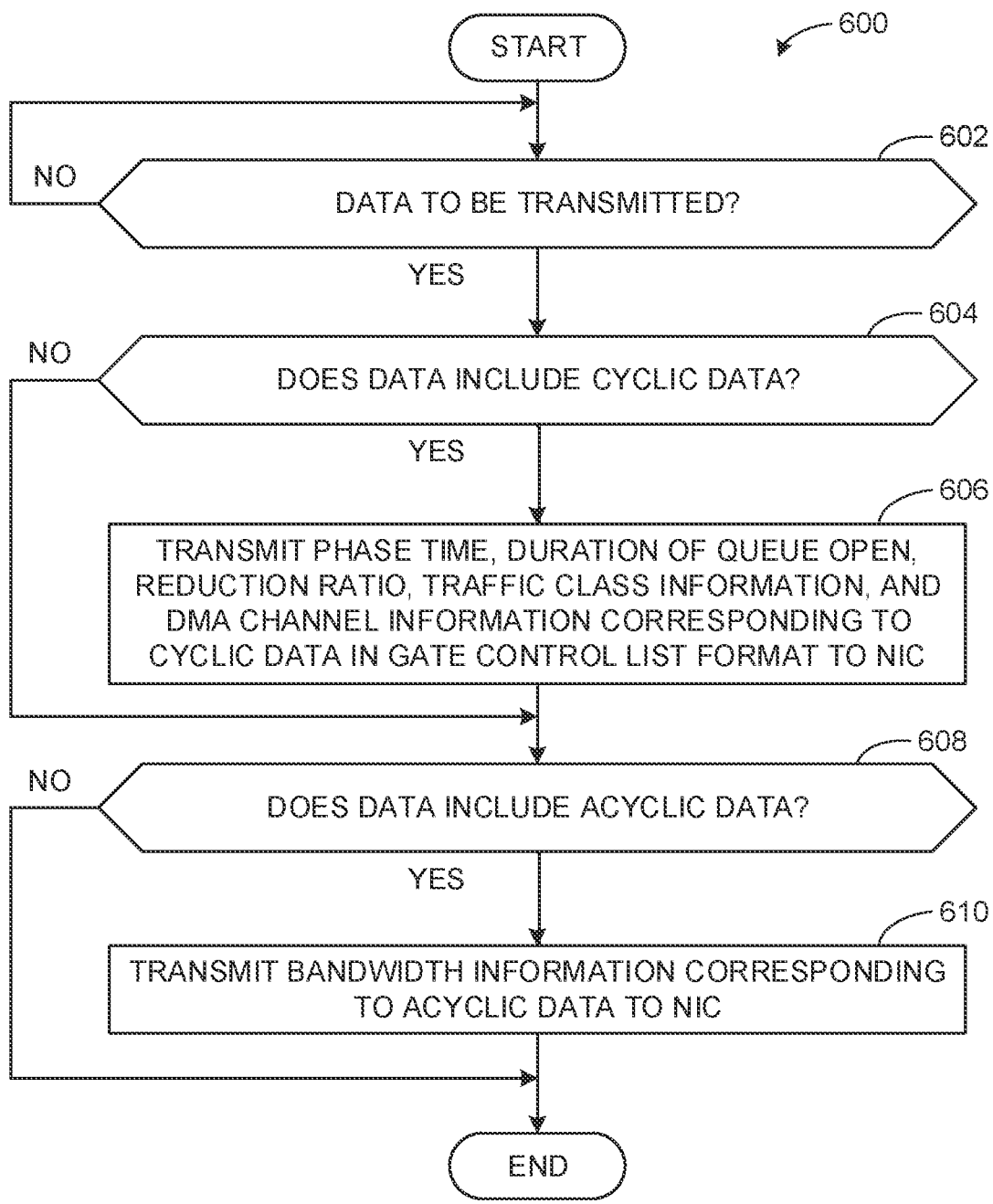
FIGS. 6-9B illustrate flowcharts representative of example machine readable instructions that may be executed to implement the processing system of FIGS. 1, 2, and/or 4.

FIG. 6 illustrates a flowchart representative of example machine readable instructions 600 that may be executed to implement the example application 104 (FIGS. 1 and/or 2) to facilitate the scheduling of data transmission of NIC 110. Although the flowchart of FIG. 6 is described in conjunction with the example processing system 100, other type(s) of processing unit(s) may be utilized instead.

At block 602, the example application 104 determines if data is to be transmitted. The application 104 may obtain a request to transmit data and/or may transmit data as part of the execution of one or more programs. If the example application 104 determines that there is no data to transmit (block 602: NO), control returns to block 602 until there is data that needs to be transmitted. If the example application 104 determines that there is data to transmit (block 602: YES), the example application 104 determines if the data includes cyclic data (e.g., data to be sent more than once) (block 604).

If the example application 104 determines that the data does not include cyclic data (block 604: NO), control continues to block 608, as further described below. If the example application 104 determines that the data does includes cyclic data (block 604: YES), the example application 104 transmits the phase time for the data, the duration of the queue open for the data, the reduction ratio of the data, the traffic class information (e.g., which traffic class the data should be identified with), and DMA channel information (e.g., which channel to transmit for the data stream) corresponding to the cyclic data in a gate control list format (e.g., the gate control list format 310 of FIG. 3) to the example NIC 110 (block 606).

At block 608, the example application 104 determines if the data includes acyclic data (e.g., non-periodic data). If the example application 104 determines that the data does not include acyclic data (block 608: NO), the instruction 600 end. If the example application 104 determines that the data does includes acyclic data (block 608: YES), the example application 104 transmits the bandwidth information corresponding to the acyclic data to the example NIC 110 (block 610). The bandwidth information lets the NIC 110 know how many time slots to reserve for the acyclic data to ensure that all of the data is properly transmitted.

Figure 7A:
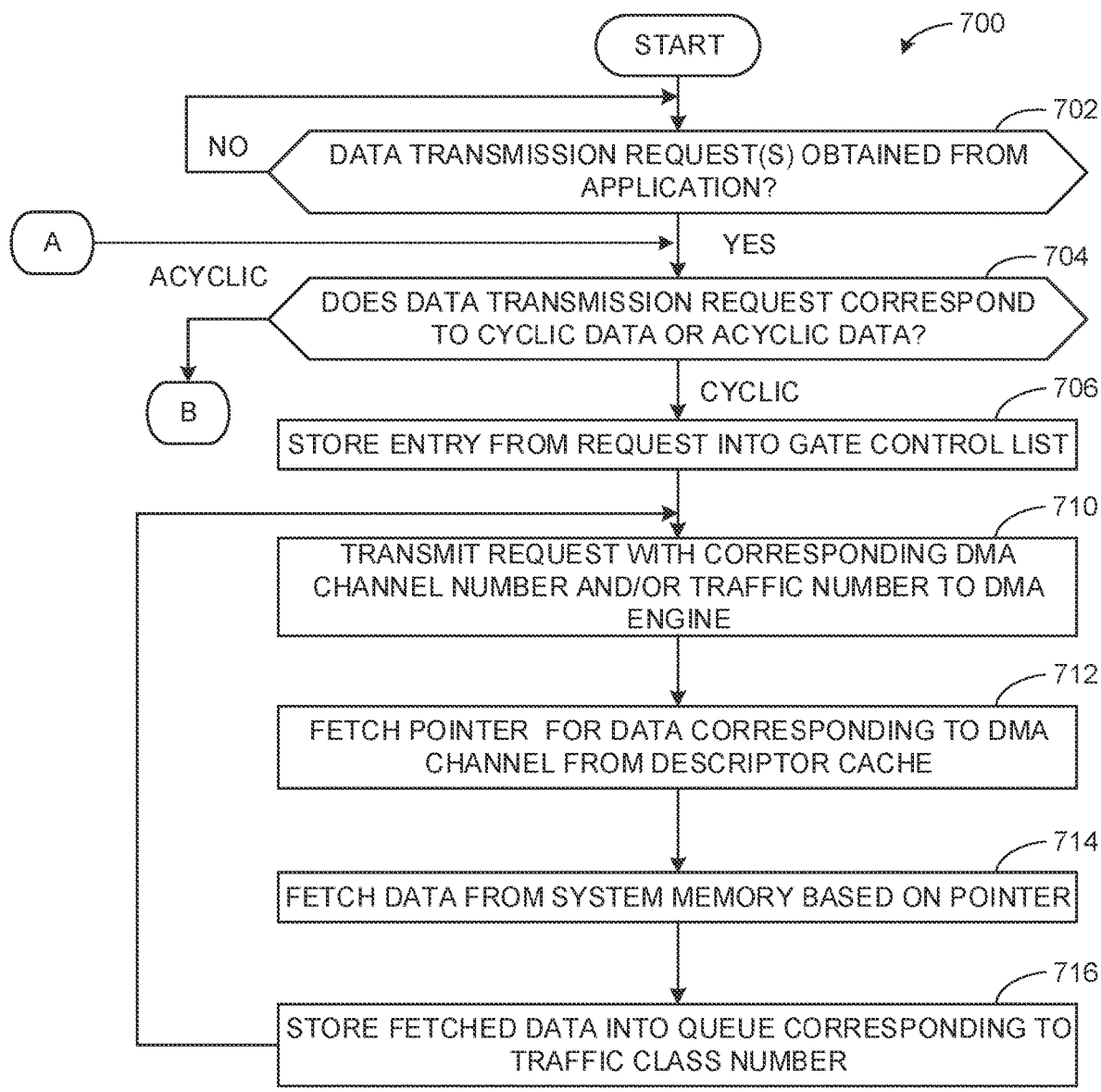
Figure 7B:
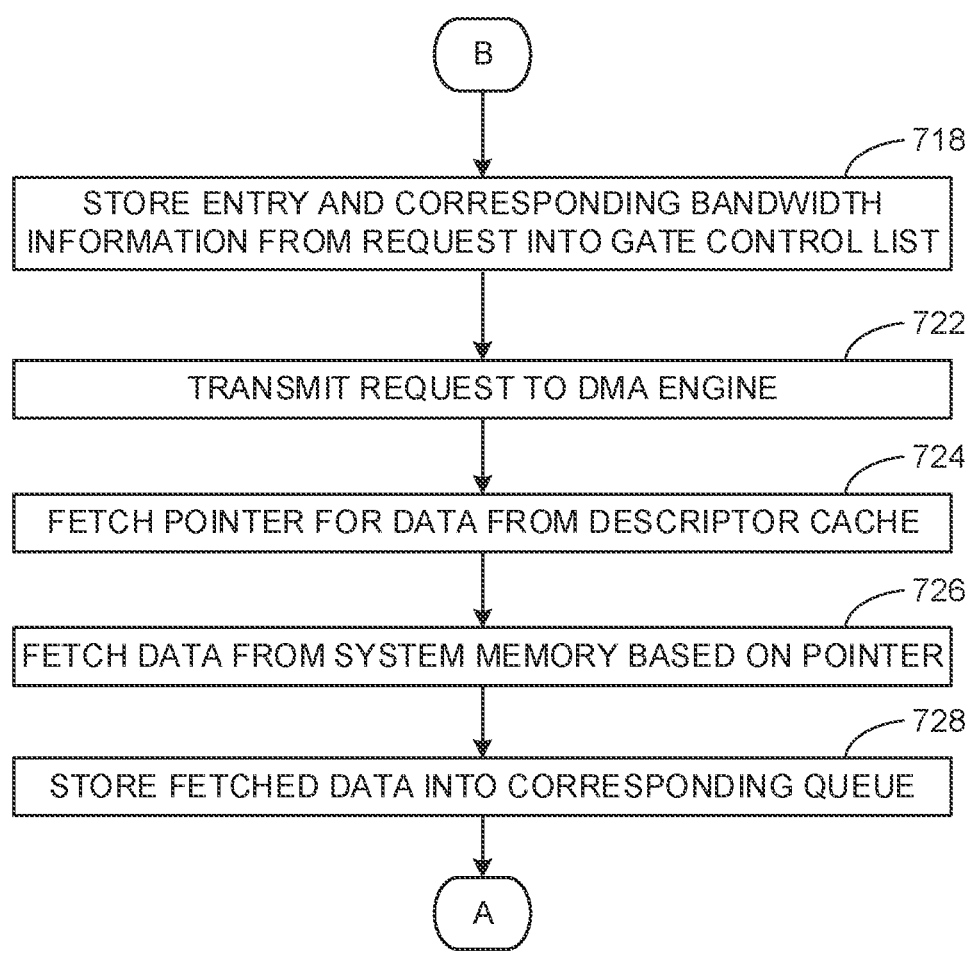

FIGS. 7A and 7B illustrate a flowchart representative of example machine readable instructions 700 that may be executed to implement the example NIC 110 (FIGS. 1 and/or 2) to facilitate accessing of data streams from the system memory 106 and storing in the example queues 208*a-n* of FIG. 2. Although the flowchart of FIG. 7 is described in conjunction with the example NIC 110 of the example processing system 100, other type(s) of NIC(s), and/or other type(s) of processing unit(s) may be utilized instead.

At block 702, the example MAC 210 determines if one or more data transmission requests have been obtained from the application 104. If the example MAC 210 determines that one or more data transmission requests have not been obtained (block 702: NO), control returns to block 702 until one or more data transmission requests are obtained. If the example MAC 210 determines that one or more data transmission requests have been obtained (block 702: YES), the example scheduler 212 of the MAC 210 determines if the one or more data transmission requests corresponds to cyclic data or acyclic data (block 704). If the example scheduler 212 determines that the data transmission request corresponds to acyclic data (block 704: ACYCLIC), control continues to block 718, as further described below.

If the example scheduler 212 determines that the data transmission request corresponds to cyclic data (block 704: CYCLIC), the example scheduler 212 stores the entry from the request into a gate control list (e.g., an enhanced gate control list) (block 706). As further described below, the scheduler 212 uses the entries of the enhanced gate control list to schedule the data streams obtained from the system memory 106 and stored in the queues 208*a*-208*n* based on the enhanced gate control list and the traffic class numbers corresponding to the data streams.

In some examples, the example scheduler 212 determines the traffic class information for the data stream and the DMA channel information for the data stream based on the data transmission request(s). The traffic class information lets the DMA engine 202 know which traffic class the data stream should belong to (e.g., which queue 208*a*-208*n* to store the data stream into) the priority of the data stream. At block 710, the example scheduler 212 transmits the request corresponding to the traffic class number and DMA channel number to the DMA engine 202.

At block 712, the example DMA engine 202 fetches the pointer for the data from the example descriptor cache 203 using the obtained class number. As described above, the example descriptor cache 203 includes a memory address pointers corresponding to memory address locations of data streams. In this manner, the DMA engine 202 can use a prefetched descriptor to find the memory address location for the data stream from the example descriptor cache 203. At block 714, the example DMA engine 202 fetches the data from the system memory 106 by sending a request for the data stream at the obtained memory address location and obtaining the corresponding data stream via the interconnect 204, the interconnect 206, and/or any other component in response to the request.

At block 716, the example DMA engine 202 stores the fetched data stream into a queue corresponding to the traffic class number and control returns to block 710 (e.g., to transmit a subsequent request). As described above, each traffic class corresponds to a particular queue 208*a-n*. Accordingly, the DMA engine 202 stores the fetched data stream in the queue that corresponds to the traffic class number of listed in the enhanced gate control list (e.g., given by the application 104).

If the example scheduler 212 determines that the data transmission request corresponds to acyclic data (block 704: ACYCLIC), the example scheduler 212 stores the entry from the request into a gate control list (e.g., an enhanced gate control list) (block 718). As further described below, the scheduler 212 uses the entries of the enhanced gate control list to schedule the data streams obtained from the system memory 106 and stored in the queues 208*a*-208*n* based on the enhanced gate control list and the traffic class numbers corresponding to the data streams. At block 722, the example scheduler 212 transmits the request corresponding to the traffic class number and DMA channel number to the DMA engine 202.

At block 724, the example DMA engine 202 fetches the pointer for the data from the example descriptor cache 203 using the obtained class number. As described above, the example descriptor cache 203 includes address pointers to data payloads in the memory 106. In this manner, the DMA engine 202 can use the descriptors to find a pointer corresponding to the memory address location for the data stream from the example descriptor cache 203. At block 726, the example DMA engine 202 fetches the data from the system memory 106 by sending a request for the data stream at the obtained memory address location and obtaining the corresponding data stream via the interconnect 204, the interconnect 206, and/or in response to the request.

At block 728, the example DMA engine 202 stores the fetched data stream into a queue corresponding to the traffic class number. As described above, each traffic class corresponds to a particular queue 208*a-n*. Accordingly, the DMA engine 202 stores the fetched data stream in the queue that corresponds to the traffic class number of listed in the enhanced gate control list (e.g., given by the application 104).

Figure 8:
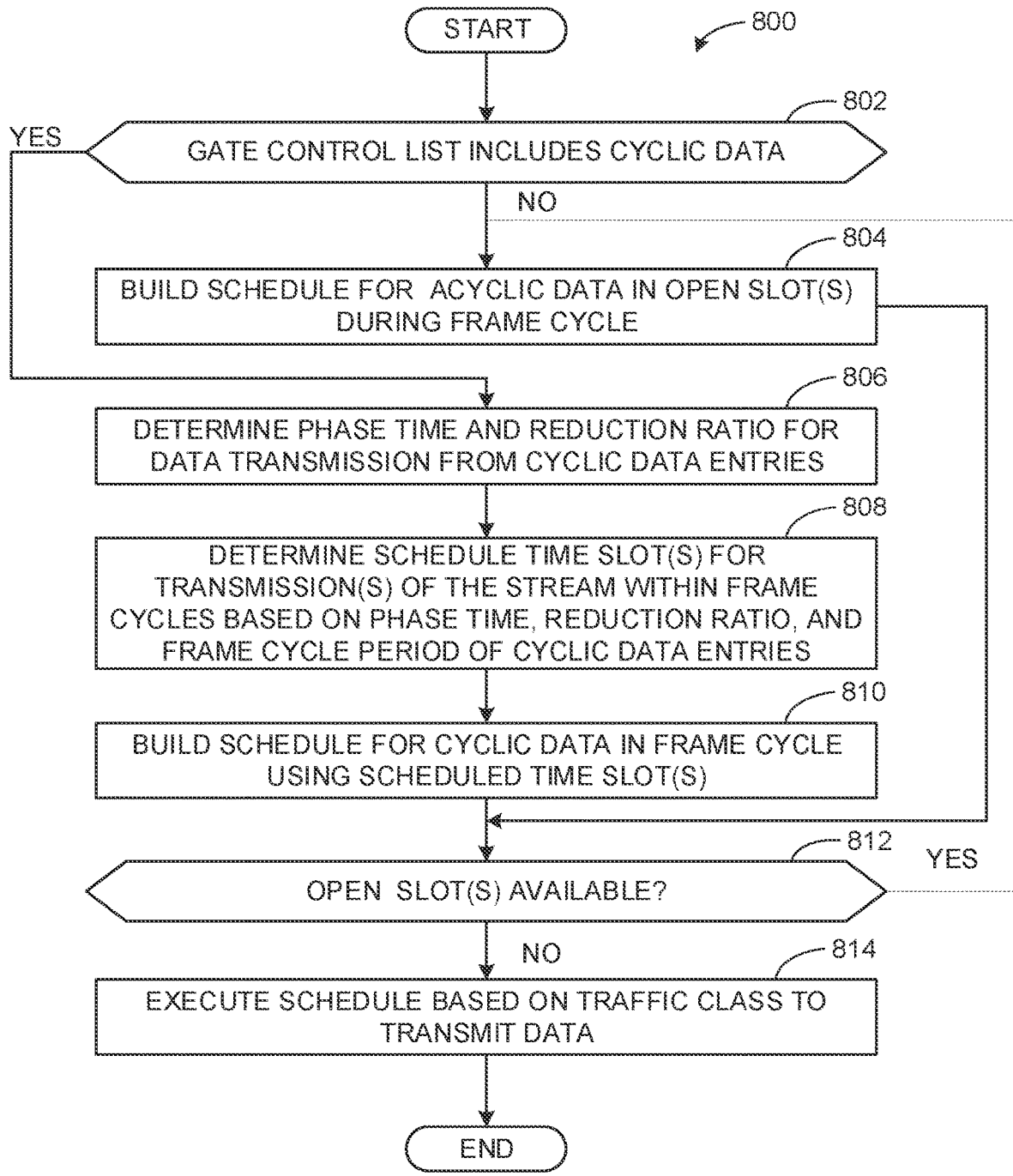

FIG. 8 illustrates a flowchart representative of example machine readable instructions 800 that may be executed to implement the example NIC 110 (FIGS. 1 and/or 2) to schedule transmissions of data streams stored in the example queues 208a-208n prior to the transmission of the data streams for one or more frame cycles. Although the flowchart of FIG. 8 is described in conjunction with the example NIC 110 of the example processing system 100, other type(s) of NIC(s), and/or other type(s) of processing unit(s) may additionally or alternatively be utilized.

At block 804, the example scheduler 212 determines if the gate control list includes cyclic data. If the example scheduler 212 determines that the gate control list does not include cyclic data (block 802: NO), the example scheduler 212 builds a schedule for the acyclic data in open slot(s) during one or more frame cycles (block 804). If the acyclic data corresponds to a priority, the scheduler 212 may schedule the data in one or more open slots during the frame cycles based on the priority (a higher priority is scheduled earlier then a lower priority).

If the example scheduler 212 determines that the gate control list includes cyclic data (block 802: YES), the example scheduler 212 determines the phase time(s) and reduction ratio(s) for the cyclic data transmission(s) (block 806). In some examples, the scheduler 212 may prioritize particular traffic classes and/or channels and may process the prioritize traffic classes and/or channels before processing traffic classes and/or channels with a lower priority. As described above, the phase time may be selected by the application 104 based on the priority of the data streams.

At block 808, the example scheduler 212 determines scheduled time slot(s) for transmission of the data stream(s) within the one or more frame cycles based on the phase time(s), reduction ratio(s), and frame cycle period(s) from the cyclic data (e.g., which is included in the enhanced gate control list)). At block 810, the example scheduler 212 builds the schedule for the cyclic data stream(s) in the frame cycle(s) based on the phase time(s), reduction ratio(s), and frame cycle period(s) from the enhanced gate control list (e.g., using the above Equation 1). At block 812, the example scheduler 212 determines if there are open slot(s) available (time slots that have not been scheduled with the cyclic data). If the scheduler 212 determines that there is one or more open time slot(s) available (block 812: YES), control returns to block 804 to schedule the remaining entries with acyclic data. If the scheduler 212 determines that there is not an open time slot available (block 812: NO), the example scheduler 212 executes the schedule by controlling the MUX 216 (using one or more control signals at the select input of the MUX 216) based on the generated schedule and traffic class to transmit data (block 820). For example, the scheduler 212 uses the timing information from the example clock 214 to determine when a time slot occurs and controls the MUX 216 to output an entry from a queue 208a-208n corresponding to the scheduled time slot. When the duration corresponding to the time slot finishes, the scheduler 212 adjusts the control signal(s) to the MUX 216 to ensure that the next data stream corresponding to the next time slot based on the schedule is output by the MUX 216. The output of the MUX 216 is transmitted out to another device via a wired or wireless network (e.g., using a PHY).

Figure 9A:
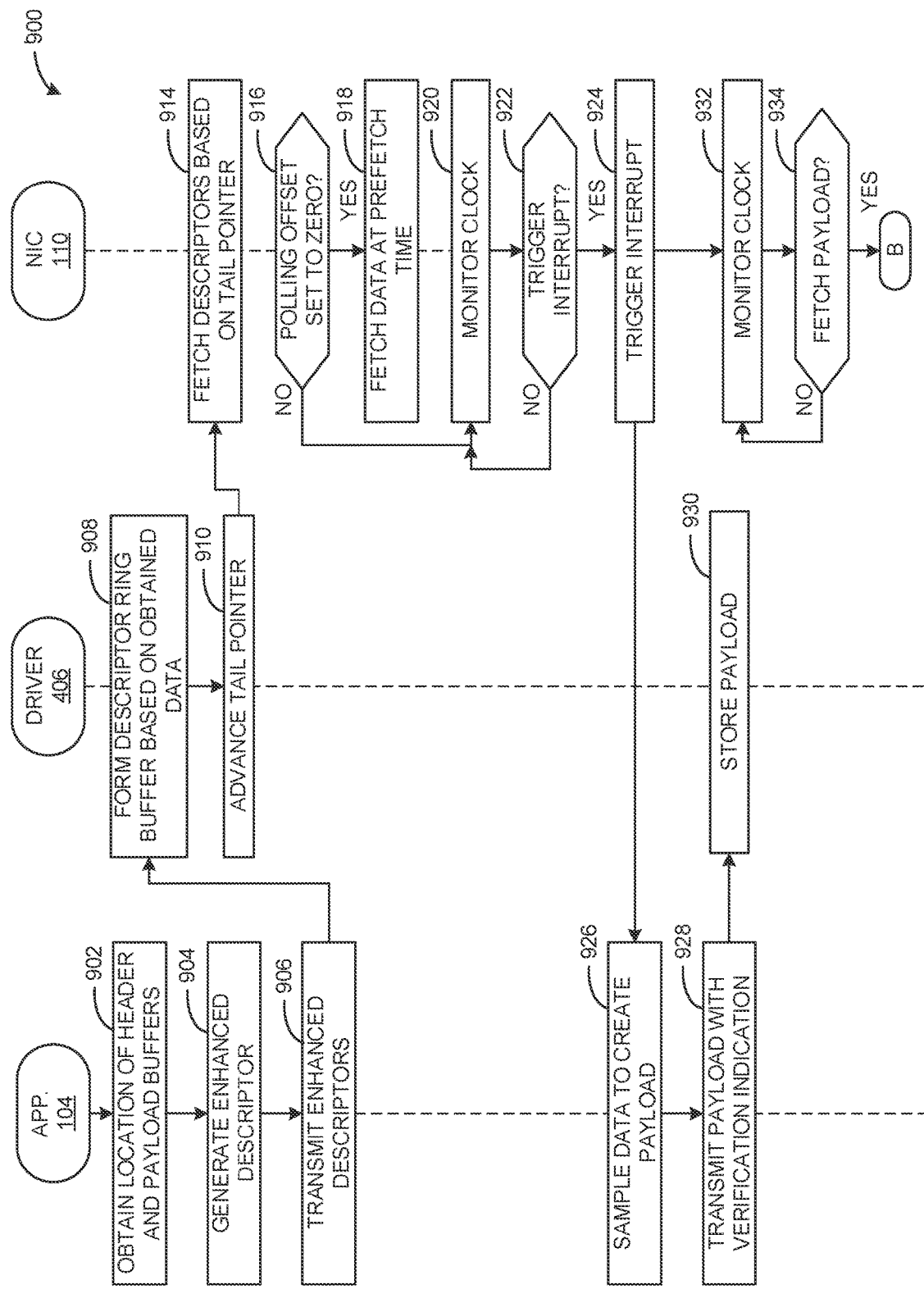
Figure 9B:
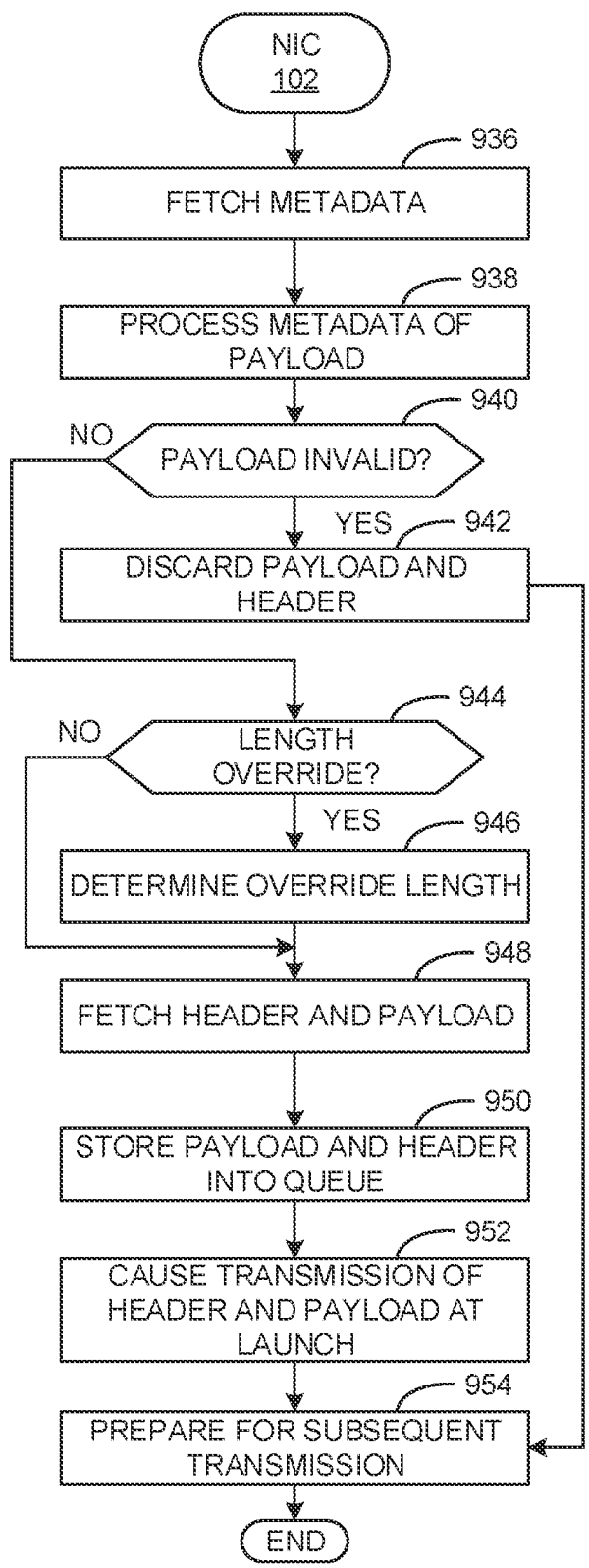

FIGS. 9A and 9B illustrate a flowchart representative of example machine readable instructions 900 that may be executed to implement the example application 104, the example network driver 406, and the example NIC 110 of FIGS. 1 and/or 4 to decrease the end-to-end latency of transmitting real-time data. Although the flowchart of FIGS. 9A and 9B is described in conjunction with the example processing system 100 of FIGS. 1 and/or 4, the flowchart may be described in conjunction with other type(s) of processing unit(s). As described above, although the example memory address locator 420, the example descriptor generator 422, and/or the example payload generator 424 are implemented in the example application 104, some or all of the example memory address locator 420, the example descriptor generator 422, and/or the example payload generator 424 may be implemented in the network driver 406.

At block 902, the example memory address locator 420 obtains locations (e.g., memory address locations) of a header buffer and payload buffer for a data packet to be transmitted to another device. The example application 104 may select the locations or communicate with the system memory 106 to obtain the locations of the header and/or payload buffer from the system memory 106. At block 904, the example descriptor generator 422 generates an enhanced descriptor for the data to be transmitted. As described above, the application 104 includes a launch time and packet length, a transmission descriptor type to support real-time payload polling, a poll time offset (e.g., from launch time) for packet payload buffer, addresses of the frame buffers for the header and payload, and a packet header length in the enhanced descriptor.

At block 906, the example descriptor generator 422 transmits the enhanced descriptor to the example system memory 106 via the socket 402 (e.g., using a driver). At block 908, the example system memory 106 forms the descriptor ring buffer from the obtained data (e.g., without the payload being formed). At block 910, a driver advances the tail pointer in the example NIC 110. At block 914, after the tail pointer is advanced, the example DMA engine 410 of the NIC 110 fetches the enhanced descriptors based on the tail pointer from the system memory 106. At block 916, the example scheduler 414 determines if the polling offset is set to zero (e.g., the polling offset is included in the fetched enhanced descriptors).

If the example scheduler 414 determines that the polling offset is set to zero (block 918: YES), the example NIC 110 fetches the payload from the system memory 106 based on a location identified in the enhanced descriptors at the prefetch time (block 918) and the instructions end. If the example scheduler 414 determines that the polling offset is not set to zero (block 918: NO), the example DMA engine 410 monitors the clock (e.g., the PTP clock to determine the launch time minus the poll time offset (block 920). As described above, the NIC 110 is to trigger an interrupt at the launch time minus the poll time offset, because the poll time offset corresponds to the amount of time that the application 104 needs to poll and store data in the system memory.

At block 922, the example DMA engine 410 determines if it is time to trigger an interrupt (e.g., if the time of the monitored clock corresponds to the launch time minus the poll time offset). If the example DMA engine 410 determines that it is not time to trigger the interrupt (block 922: NO), control returns to block 920 until it is time to trigger the interrupt. If the example DMA engine 410 determines that it is time to trigger the interrupt (block 922: YES), the example scheduler 414 triggers the interrupt (e.g., transmits the interrupt to the application 104) (block 924). As described above, the interrupt may be passed to the application 104 via the network driver 406 of the kernel space of FIG. 4.

At block 926, after the example payload generator 424 receives, identifies, or is otherwise aware of the interrupt, the example payload generator 424 samples data to generate the payload. At block 928, the example payload generator 424 transmits the payload with a verification indication to the example system memory 106 via the socket 402 (e.g., using a driver). The verification indication is an indication of whether the sampled data is complete and valid. For example, if there was a software error or the payload could not be complete, the application 104 will include a verification indication that corresponds to an error. The verification indication may also include an override indication and, if the override indication corresponds to an override, an override payload length. An override may occur when the application 104 determines that the enhanced descriptors include a payload length that is no longer valid (e.g., too long or too short) (at block 906) because the exact length of the payload may not be known at block 906 and may have been estimated. In this manner, the system memory 106 and the NIC 110 can be aware of the change in payload length. Accordingly, the application 104 compares the length of the payload to the length indicated in the enhanced descriptors to see if the lengths are the same and sets an override indication and/or length based on the result of the comparison.

At block 930, the system memory 106 obtains the payload with the verification indication from the example application 104 and stores the payload. Additionally, the example system memory 106 includes the verification indication (e.g., including the override indication and/or length) as metadata for the payload (e.g., 64-bit metadata stored at the headroom of the packet payload frame buffer). At block 932, the example DMA engine 410 monitors the clock (e.g., the PTP clock to determine the launch time minus the prefetch time offset (block 920). As described above, the prefetch time offset corresponds to the amount of time that the NIC 110 needs to fetch the data from the system memory 106 plus an interrupt latency. Thus, the DMA engine 410 monitors the clock to fetch the payload at approximately launch time minus the prefetch time offset to ensure that the payload is ready to be fetched.

At block 934, the example DMA engine 410 determines if it is time to fetch the payload based on the monitored clock (e.g., when launch time minus the prefetch time offset occurred). If the example DMA engine 410 determines that the payload should not be fetched (block 934: NO), control returns to block 932 until it is time to fetch the payload. If the example DMA engine 410 determines that the payload should be fetched (block 934: YES), the example DMA engine 410 of the NIC 110 fetches the metadata of the payload from the system memory 106 (block 936) by transmitting a request for the metadata.

At block 938, the example DMA engine 410 processes the metadata of the payload to verify that the payload is valid and/or to determine whether to override the payload length. At block 940, the example DMA engine 410 determines if the payload is valid based on the indication in the metadata. If the example DMA engine 410 determines that the payload is invalid (block 940: YES), the example DMA engine 410 cancels the transmission of the payload and discards the payload and the header from the queues 412 (block 942) and control continues to block 950. If the example DMA engine 410 determines that the payload is not invalid (block 940: NO), the example DMA engine 410 determines if the override value in the metadata is set to override the length of the payload (e.g., the length of the payload is different than the length listed in the enhanced descriptors) (block 944).

If the example DMA engine 410 determines that the override value in the metadata is set to override (block 944: YES), the example DMA engine 410 determines the updated overridden length of the payload (e.g., indicated in the metadata) (block 946) and the DMA engine 410 fetches the header and payload based on the updated overridden length (block 948). If the example DMA engine 410 determines that the override value in the metadata is not set to override (block 944: NO), the DMA engine 410 fetches the header and payload based on using the original payload packet length (block 948). In some examples, the DMA engine 410 determines the original payload packet length using the packet length and the header length (e.g., the payload length is the packet length minus the header length).

At block 950, the example DMA engine 410 fetched payload and header into the queue. At block 952, the example scheduler 414 of the NIC 110 causes transmission of the header and payload. For example, the scheduler 414 pulls the header and payload from the queue 412 and transmit the header and payload to the example PHY 416 of FIG. 4 for transmission. At block 954, the example NIC 110 prepares for a subsequent transmission. For example, the DMA engine 410 updates the transmission status, clears an OWN bit on the transmission descriptor, and generates a transmission done interrupt to trigger subsequent releasing of transmission frame buffers from the application 104. When the OWN bit is set, the NIC 110 owns the data and when the OWN bit is reset, the application 104 and/or driver 406 owns the data. Based on the link speed of the NIC 110 and the packet payload length passed by the application 104, the NIC 110 may compute a poll time offset on behave of the application 104 for subsequent transmissions. In this manner, the network stack in the kernel space and the application 104 may implement the payload polling/data sampling operation and the packet payload construction.

Figure 10:
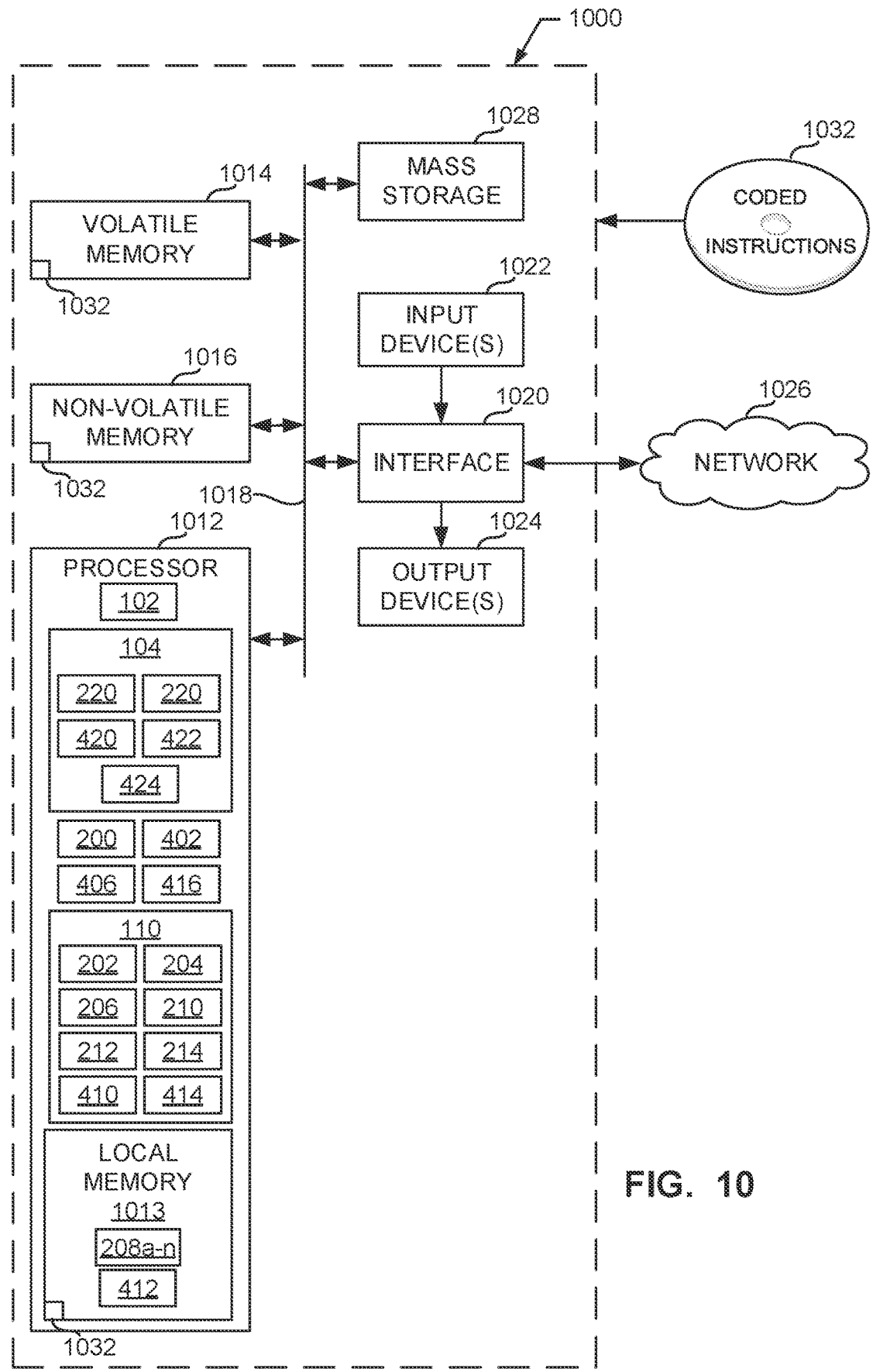
FIG. 10 is a block diagram of an example processor platform structured to execute the instructions of FIG. 6-9B to implement the processing system of FIGS. 1, 2, and/or 4.

FIG. 10 is a block diagram of an example processor platform 1000 structured to execute the instructions of FIGS. 6, 7A-7B, 8, and/or 9 to implement components of the processing system 100 of FIGS. 1, 2, and/or 4. The processor platform 1000 can be, for example, a server, a personal computer, a workstation, a self-learning machine (e.g., a neural network), a mobile device (e.g., a cell phone, a smart phone, a tablet such as an iPad), or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1012 implements the example core(s) 102, the example application 104, the example NIC 110, the example driver 200, the example DMA engine 202, the example interconnect 204, the example interconnect 206, the example MAC 210, the example scheduler 212, the example clock 214, the example data transmission manager 220, the example traffic type detector 222, the example socket 402, the example driver 406, the example PHY 416, the example memory address detector 420, the example descriptor generator 422, and the example payload generator 424.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip, and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives. In some examples, any one of the example local memory 1013, the example volatile memory 1014, the example non-volatile memory 1015, and/or the example mass storage 1028 may implement any one of the example system memory 106, the example queues 208a-208n, the example network stack 404, and/or the example queues 412.

The machine executable instructions 1032 of FIGS. 6-9B may be stored in the mass storage device 1028, in the volatile memory 1014, in the non-volatile memory 1016, and/or on a removable non-transitory computer readable storage medium such as a CD or DVD.

Example methods, apparatus, systems, and articles of manufacture to transmit and/or receive data streams with a network interface controller are disclosed herein. Further examples and combinations thereof include the following:

Example 1 includes an apparatus to transmit a payload, the apparatus comprising a direct memory access engine to fetch a descriptor for a data transmission from system memory, and determine a time to generate an interrupt based on the descriptor, a scheduler to trigger the interrupt when the time occurs, the interrupt to cause an application to sample data and store the sampled data as a payload data structure into the system memory, the direct memory access engine to access the payload data structure from the system memory, and the scheduler to cause transmission of the payload data structure.

Example 2 includes the apparatus of example 1, wherein the direct memory access engine is to fetch the descriptor corresponding to the data transmission to be stored in the system memory prior to the application generating the payload data structure for the transmission of the payload data structure.

Example 3 includes the apparatus of example 1, further including a hardware-based clock, the scheduler to trigger the interrupt by monitoring the hardware-based clock.

Example 4 includes the apparatus of examples 1-3, wherein the direct memory access engine is to determine the time based on a difference between a launch time and a poll time offset, the launch time and the poll time offset included in the descriptor.

Example 5 includes the apparatus of examples 1-4, wherein the time is a first time, the direct memory access engine to access the payload data structure from the system memory at a second time, the second time corresponding to a difference between a launch time and a prefetch time offset.

Example 6 includes the apparatus of examples 1-5, wherein the direct memory access engine is to process metadata of the payload data structure to determine a validity of the payload data structure.

Example 7 includes the apparatus of example 6, wherein the scheduler is to cancel the transmission of the payload data structure when the validity corresponds to invalid.

Example 8 includes the apparatus of examples 1-7, wherein the direct memory access engine is to process metadata of the payload data structure to determine if a payload data structure length included in the descriptor is inaccurate.

Example 9 includes a non-transitory computer readable storage medium comprising instructions which, when executed, cause one or more processors to at least fetch a descriptor for a data transmission from system memory, and determine a time to generate an interrupt based on the descriptor, trigger the interrupt when the time occurs, the interrupt to cause an application to sample data and store the sampled data as a payload data structure into the system memory, access the payload data structure from the system memory, and cause transmission of the payload data structure.

Example 10 includes the non-transitory computer readable storage medium of example 9, wherein the instructions cause the one or more processors to fetch the descriptor corresponding to the data transmission to be stored in the system memory prior to the application generating the payload data structure for the transmission of the payload data structure.

Example 11 includes the non-transitory computer readable storage medium of examples 9-10, wherein the instructions cause the one or more processors to trigger the interrupt by monitoring a hardware-based clock.

Example 12 includes the non-transitory computer readable storage medium of examples 9-11, wherein the instructions cause the one or more processors to determine the time based on a difference between a launch time and a poll time offset, the launch time and the poll time offset included in the descriptor.

Example 13 includes the non-transitory computer readable storage medium of examples 9-12, wherein the time is a first time, the instructions to cause the one or more processors to access the payload data structure from the system memory at a second time, the second time corresponding to a difference between a launch time and a prefetch time offset.

Example 14 includes the non-transitory computer readable storage medium of examples 9-14, wherein the instructions cause the one or more processors to process metadata of the payload data structure to determine a validity of the payload data structure.

Example 15 includes the non-transitory computer readable storage medium of example 14, wherein the instructions cause the one or more processors cancel the transmission of the payload data structure when the validity corresponds to invalid.

Example 16 includes the non-transitory computer readable storage medium of examples 9-15, wherein the instructions cause the one or more processors to process metadata of the payload data structure to determine if a payload data structure length included in the descriptor is inaccurate.

Example 17 includes a method to transmit a payload, the method comprising fetching a descriptor for a data transmission from system memory, and determining, by executing an instruction with a processor, a time to generate an interrupt based on the descriptor, triggering, by executing an instruction with the processor, the interrupt when the time occurs, the interrupt to cause an application to sample data and store the sampled data as a payload data structure into the system memory, accessing the payload data structure from the system memory, and causing transmission of the payload data structure.

Example 18 includes the method of example 17, wherein the fetching of the descriptor corresponding to the data transmission to be stored in the system memory includes fetching the descriptor prior to the application generating the payload data structure for the transmission of the payload data structure.

Example 19 includes the method of examples 17-18, wherein the triggering of the interrupt includes monitoring the hardware-based clock.

Example 20 includes the method of examples 17-19, wherein the determining of the time is based on a difference between a launch time and a poll time offset, the launch time and the poll time offset included in the descriptor.

Example 21 includes the method of examples 17-20, wherein the time is a first time, further including accessing the payload data structure from the system memory at a second time, the second time corresponding to a difference between a launch time and a prefetch time offset.

Example 22 includes the method of examples 17-21, further including processing metadata of the payload data structure to determine a validity of the payload data structure.

Example 23 includes the method of example 22, further including cancelling the transmission of the payload data structure when the validity corresponds to invalid.

Example 24 includes the method of examples 17-23, further including process metadata of the payload data structure to determine if a payload data structure length included in the descriptor is inaccurate.

Example 25 includes an apparatus to transmit a payload, the apparatus comprising means for accessing data from system memory, the means for accessing to fetch a descriptor for a data transmission from system memory, and determine a time to generate an interrupt based on the descriptor, means for triggering the interrupt when the time occurs, the interrupt to cause an application to sample data and store the sampled data as a payload data structure into the system memory, the means for accessing to access engine to access the payload data structure from the system memory, and the means for triggering to cause transmission of the payload data structure.

Example 26 includes the apparatus of example 25, wherein the means for accessing is to fetch the descriptor corresponding to the data transmission to be stored in the system memory prior to the application generating the payload data structure for the transmission of the payload data structure.

Example 27 includes the apparatus of examples 25-26, further including means for tracking time, the means for triggering to trigger the interrupt by monitoring the means for tracking time.

Example 28 includes the apparatus of examples 25-27, wherein the means for accessing is to determine the time based on a difference between a launch time and a poll time offset, the launch time and the poll time offset included in the descriptor.

Example 29 includes the apparatus of examples 25-28, wherein the time is a first time, the means for accessing to access the payload data structure from the system memory at a second time, the second time corresponding to a difference between a launch time and a prefetch time offset.

Example 30 includes the apparatus of examples 25-29, wherein the means for accessing is to process metadata of the payload data structure to determine a validity of the payload data structure.

Example 31 includes the apparatus of example 30, wherein the means for triggering is to cancel the transmission of the payload data structure when the validity corresponds to invalid.

Example 32 includes the apparatus of examples 25-30, wherein the means for accessing is to process metadata of the payload data structure to determine if a payload data structure length included in the descriptor is inaccurate.

Example 33 includes a network controller interface (NIC) to schedule transmission of a data stream, the NIC comprising a media access controller to store a single entry in a gate control list corresponding to a cyclic data stream, and transmit a traffic class corresponding to the cyclic data stream to a direct memory access engine, the direct memory access engine to determine a memory address of the cyclic data stream, fetch the cyclic data stream from memory based on the memory address, and store the fetched cyclic data stream in a queue corresponding to the traffic class, and a scheduler to build a schedule for transmission of the cyclic data stream at multiple time slots based on a reduction ratio of the cyclic data stream.

Example 34 includes the NIC of example 33, wherein the entry includes at least one of a phase time of the data stream, a duration of the data stream, the reduction ratio for the data stream, a channel number of the data stream, and the traffic class of the data stream.

Example 35 includes the NIC of examples 33-34, wherein the media access controller is to obtain the at least one of the phase time of the data stream, the duration of the data stream, the reduction ratio for the data stream, the channel number of the data stream, and the traffic class of the data stream from an application.

Example 36 includes the NIC of examples 33-35, wherein the direct memory access engine is to determine the memory address of the cyclic data stream from a descriptor cache.

Example 37 includes the NIC of examples 33-36, wherein the reduction ratio corresponds to a number of times the data stream is transmitted during a frame cycle.

Example 38 includes the NIC of examples 33-37, the scheduler is to build the schedule for the transmission of the cyclic data stream by determining one or more time slots of a frame cycle based on the reduction ratio, a phase time, and a period of the frame cycle, and building the schedule for the cyclic data stream to be transmitted at the one or more time slots.

Example 39 includes the NIC of examples 33-37, wherein the media access controller is to store a second single entry in the gate control list corresponding to a acyclic data stream, and the scheduler to include transmission of the acyclic data stream in the schedule using unused time slots of a frame cycle after the cyclic data streams have been scheduled.

Example 40 includes a non-transitory computer readable storage medium comprising instructions which, when executed, cause one or more processors to at least store a single entry in a gate control list corresponding to a cyclic data stream, transmit a traffic class corresponding to the cyclic data stream to a direct memory access engine, determine a memory address of the cyclic data stream, fetch the cyclic data stream from memory based on the memory address, store the fetched cyclic data stream in a queue corresponding to the traffic class, and generate a schedule for transmission of the cyclic data stream at multiple time slots based on a reduction ratio of the cyclic data stream.

Example 41 includes the non-transitory computer readable storage medium of example 40, wherein the entry includes at least one of a phase time of the data stream, a duration of the data stream, the reduction ratio for the data stream, a channel number of the data stream, and the traffic class of the data stream.

Example 42 includes the non-transitory computer readable storage medium of examples 40-41, wherein the instructions cause the one or more processors to obtain the at least one of the phase time of the data stream, the duration of the data stream, the reduction ratio for the data stream, the channel number of the data stream, and the traffic class of the data stream from an application.

Example 43 includes the non-transitory computer readable storage medium of examples 40-42, wherein the instructions cause the one or more processors to determine the memory address of the cyclic data stream from a descriptor cache.

Example 44 includes the non-transitory computer readable storage medium of examples 40-43, wherein the reduction ratio corresponds to a number of times the data stream is transmitted during a frame cycle.

Example 45 includes the non-transitory computer readable storage medium of examples 40-44, wherein the instructions cause the one or more processors to schedule the transmission of the cyclic data stream by determining one or more time slots of a frame cycle based on the reduction ratio, a phase time, and a period of the frame cycle, and building the schedule for the cyclic data stream to be transmitted at the one or more time slots.

Example 46 includes the non-transitory computer readable storage medium of examples 40-45, wherein the instructions cause the one or more processors to store a second single entry in the gate control list corresponding to a acyclic data stream, and include the acyclic data stream in the schedule using unused time slots of a frame cycle after the cyclic data streams have been scheduled.

Example 47 includes a method to schedule transmission of a data stream, the method comprising storing a single entry in a gate control list corresponding to a cyclic data stream, and transmitting a traffic class corresponding to the cyclic data stream to a direct memory access engine, determining, by executing an instruction with a processor, a memory address of the cyclic data stream, fetching the cyclic data stream from memory based on the memory address, and storing the fetched cyclic data stream in a queue corresponding to the traffic class, and creating, by executing an instruction with a processor, a schedule transmission of the cyclic data stream at multiple time slots based on a reduction ratio of the cyclic data stream.

Example 48 includes the method of example 47, wherein the entry includes at least one of a phase time of the data stream, a duration of the data stream, the reduction ratio for the data stream, a channel number of the data stream, and the traffic class of the data stream.

Example 49 includes the method of examples 47-48, further including obtaining the at least one of the phase time of the data stream, the duration of the data stream, the reduction ratio for the data stream, the channel number of the data stream, and the traffic class of the data stream from an application.

Example 50 includes the method of examples 47-49, further including determining the memory address of the cyclic data stream from a descriptor cache.

Example 51 includes the method of examples 47-50, wherein the reduction ratio corresponds to a number of times the data stream is transmitted during a frame cycle.

Example 52 includes the method of examples 47-51, wherein the scheduling of the transmission of the cyclic data stream includes determining one or more time slots of a frame cycle based on the reduction ratio, a phase time, and a period of the frame cycle, and creating the schedule for the cyclic data stream to be transmitted at the one or more time slots.

Example 53 includes the method of examples 47-52, further including storing a second single entry in the gate control list corresponding to a acyclic data stream, and including transmission of the acyclic data stream in the schedule using unused time slots of a frame cycle after the cyclic data streams have been scheduled.

Example 54 includes a network controller interface (NIC) to schedule transmission of a data stream, the NIC comprising means for transmitting data, the means for transmitting data to store a single entry in a gate control list corresponding to a cyclic data stream, and transmit a traffic class corresponding to the cyclic data stream to a means for accessing data, the means for accessing data to determine a memory address of the cyclic data stream, fetch the cyclic data stream from memory based on the memory address, and store the fetched cyclic data stream in a queue corresponding to the traffic class, and means for building a schedule for transmission of the cyclic data stream at multiple time slots based on a reduction ratio of the cyclic data stream.

Example 55 includes the NIC of example 54, wherein the entry includes at least one of a phase time of the data stream, a duration of the data stream, the reduction ratio for the data stream, a channel number of the data stream, and the traffic class of the data stream.

Example 56 includes the NIC of examples 54-55, wherein the means for transmitting data is to obtain the at least one of the phase time of the data stream, the duration of the data stream, the reduction ratio for the data stream, the channel number of the data stream, and the traffic class of the data stream from an application.

Example 57 includes the NIC of examples 54-56, wherein the means for accessing data is to determine the memory address of the cyclic data stream from a descriptor cache.

Example 58 includes the NIC of examples 54-57, wherein the reduction ratio corresponds to a number of times the data stream is transmitted during a frame cycle.

Example 59 includes the NIC of examples 54-58, the means for building a schedule is to build the schedule for the transmission of the cyclic data stream by determining one or more time slots of a frame cycle based on the reduction ratio, a phase time, and a period of the frame cycle, and building the schedule for the cyclic data stream to be transmitted at the one or more time slots.

Example 60 includes the NIC of examples 54-59, wherein means for transmitting data is to store a second single entry in the gate control list corresponding to a acyclic data stream, and the means for building the schedule to include transmission of the acyclic data stream in the schedule using unused time slots of a frame cycle after the cyclic data streams have been scheduled.

From the foregoing, it will be appreciated that example methods, apparatus and articles of manufacture have been disclosed herein to transmit and/or receive data streams with a network interface controller. Disclosed methods, apparatus and articles of manufacture improve the scheduling of data stream transmission by facilitating multiple data streams for one or more traffic classes, while reducing the size, space, and complexity needed to implement a gate control list. Further, disclosed methods, apparatus, and articles of manufacture improve scheduling of real time data to transmit real time data by initiating a transmission without the payload being generated and scheduling an interrupt when the NIC 110 is ready to transmit, thereby reducing the end-to-end latency of transmission real time data. Disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to transmit a payload, the apparatus comprising:
    a direct memory access engine to:
        fetch a descriptor for a data transmission from system memory; and
        determine a time to generate an interrupt based on the descriptor;
    scheduler circuitry to trigger the interrupt when the time occurs, the interrupt to cause an application to sample data and store the sampled data as a payload data structure into the system memory;
    the direct memory access engine to access the payload data structure from the system memory; and
    the scheduler circuitry to cause transmission of the payload data structure.

2. The apparatus of claim 1, wherein the direct memory access engine is to fetch the descriptor corresponding to the data transmission to be stored in the system memory prior to the application generating the payload data structure for the transmission of the payload data structure.

3. The apparatus of claim 1, further including a hardware-based clock, the scheduler circuitry to trigger the interrupt by monitoring the hardware-based clock.

4. The apparatus of claim 1, wherein the direct memory access engine is to determine the time based on a difference between a launch time and a poll time offset, the launch time and the poll time offset included in the descriptor.

5. The apparatus of claim 1, wherein the time is a first time, the direct memory access engine to access the payload data structure from the system memory at a second time, the second time corresponding to a difference between a launch time and a prefetch time offset.

6. The apparatus of claim 1, wherein the direct memory access engine is to process metadata of the payload data structure to determine a validity of the payload data structure.

7. The apparatus of claim 6, wherein the scheduler circuitry is to cancel the transmission of the payload data structure when the validity corresponds to invalid.

8. The apparatus of claim 1, wherein the direct memory access engine is to process metadata of the payload data structure to determine if a payload data structure length included in the descriptor is inaccurate.

9. A non-transitory computer readable storage medium comprising instructions to cause programmable circuitry to at least:
    fetch a descriptor for a data transmission from system memory;
    determine a time to generate an interrupt based on the descriptor;
    trigger the interrupt when the time occurs, the interrupt to cause an application to sample data and store the sampled data as a payload data structure into the system memory;
    access the payload data structure from the system memory; and
    cause transmission of the payload data structure.

10. The non-transitory computer readable storage medium of claim 9, wherein the instructions are to cause the programmable circuitry to fetch the descriptor corresponding to the data transmission to be stored in the system memory prior to the application generating the payload data structure for the transmission of the payload data structure.

11. The non-transitory computer readable storage medium of claim 9, wherein the instructions are to cause the programmable circuitry to trigger the interrupt by monitoring a hardware-based clock.

12. The non-transitory computer readable storage medium of claim 9, wherein the instructions are to cause the programmable circuitry to determine the time based on a difference between a launch time and a poll time offset, the launch time and the poll time offset included in the descriptor.

13. The non-transitory computer readable storage medium of claim 9, wherein the time is a first time, the instructions to cause the programmable circuitry to access the payload data structure from the system memory at a second time, the second time corresponding to a difference between a launch time and a prefetch time offset.

14. The non-transitory computer readable storage medium of claim 9, wherein the instructions are to cause the programmable circuitry to process metadata of the payload data structure to determine a validity of the payload data structure.

15. The non-transitory computer readable storage medium of claim 14, wherein the instructions are to cause programmable circuitry to cancel the transmission of the payload data structure when the validity corresponds to invalid.

16. The non-transitory computer readable storage medium of claim 9, wherein the instructions are to cause the programmable circuitry to process metadata of the payload data structure to determine if a payload data structure length included in the descriptor is inaccurate.

17. A method to transmit a payload, the method comprising:
fetching a descriptor for a data transmission from system memory;
determining, by executing an instruction with a processor, a time to generate an interrupt based on the descriptor;
triggering, by executing an instruction with the processor, the interrupt when the time occurs, the interrupt to cause an application to sample data and store the sampled data as a payload data structure into the system memory;
accessing the payload data structure from the system memory; and
causing transmission of the payload data structure.

18. The method of claim 17, wherein the fetching of the descriptor corresponding to the data transmission to be stored in the system memory includes fetching the descriptor prior to the application generating the payload data structure for the transmission of the payload data structure.

19. The method of claim 17, wherein the triggering of the interrupt includes monitoring a hardware-based clock.

20. The method of claim 17, wherein the determining of the time is based on a difference between a launch time and a poll time offset, the launch time and the poll time offset included in the descriptor.

21. The method of claim 17, wherein the time is a first time, further including accessing the payload data structure from the system memory at a second time, the second time corresponding to a difference between a launch time and a prefetch time offset.

22. The method of claim 17, further including processing metadata of the payload data structure to determine a validity of the payload data structure.

23. The method of claim 22, further including cancelling the transmission of the payload data structure when the validity corresponds to invalid.

24. The method of claim 17, further including process metadata of the payload data structure to determine if a payload data structure length included in the descriptor is inaccurate.

25. An apparatus to transmit a payload, the apparatus comprising:
means for accessing data from system memory, the means for accessing to:
fetch a descriptor for a data transmission from the system memory; and
determine a time to generate an interrupt based on the descriptor; and
means for triggering the interrupt when the time occurs, the interrupt to cause an application to sample data and store the sampled data as a payload data structure into the system memory;
the means for accessing to access engine to access the payload data structure from the system memory; and
the means for triggering to cause transmission of the payload data structure.

* * * * *